US010009637B2

(12) United States Patent
Jennings et al.

(10) Patent No.: US 10,009,637 B2
(45) Date of Patent: Jun. 26, 2018

(54) SYSTEM AND METHOD FOR ROUTING MEDIA

(71) Applicant: SITO Mobile R&D IP, LLC, Jersey City, NJ (US)

(72) Inventors: Charles A Jennings, Kansas City, MO (US); Donald H. Bate, Plano, TX (US)

(73) Assignee: Sito Mobile R&D IP, LLC, Jersey City, NJ (US)

( * ) Notice: Subject to any disclaimer, the term of this patent is extended or adjusted under 35 U.S.C. 154(b) by 0 days. days.

(21) Appl. No.: 15/693,811

(22) Filed: Sep. 1, 2017

(65) Prior Publication Data

US 2018/0014045 A1 Jan. 11, 2018

Related U.S. Application Data

(60) Continuation of application No. 15/451,198, filed on Mar. 6, 2017, now Pat. No. 9,756,362, which is a
(Continued)

(51) Int. Cl.
*G06F 15/16* (2006.01)
*H04N 21/234* (2011.01)
(Continued)

(52) U.S. Cl.
CPC ..... *H04N 21/23424* (2013.01); *H04L 47/724* (2013.01); *H04L 65/4084* (2013.01);
(Continued)

(58) Field of Classification Search
CPC ............. H04N 21/4622; H04N 21/458; H04N 21/4623; H04L 65/4084; H04L 65/4092;
(Continued)

(56) References Cited

U.S. PATENT DOCUMENTS 6,349,797 B1 * 2/2002 Newville .................. B66B 1/34
187/391
6,792,618 B1 * 9/2004 Bendinelli ......... H04N 7/17318
348/E7.071
(Continued)

*Primary Examiner* — Richard G Keehn
(74) *Attorney, Agent, or Firm* — Polsinelli PC

(57) ABSTRACT

In one aspect, a method for managing streaming of video content to a client device includes providing the video content to a content distribution network for storage in a plurality of geographically separated resources of the content distribution network and receiving, from the client device via a packet-based telecommunication network, signaling to have the stored video content streamed to the client device. In response to the received signaling, one or more files are transmitted to the client device via the packet-based telecommunication network, each of the one or more files being in a format compatible with a media player on the client device, the one or more files comprising (i) an identification of one or more of the resources of the content distribution network available to facilitate streaming of one or more segments of the stored video content to the client device, the identification being dependent at least in part on a relationship between a geographic location of the client device and geographic locations of the resources of the content distribution network, and (ii) an identification of an advertising server, the identification of the advertising server being dependent at least in part on a relationship between the geographic location of the client device and a geographic location of the advertising server, wherein the one or more files, when processed by the client device, cause the client device to communicate with the identified one or more resources of the content distribution network and the advertising server to cause the one or more segments of the stored video to be streamed to the client device by the identified one or more resources of the content distribution network and cause one or more advertisements to be streamed from the advertising server to the client device.

20 Claims, 17 Drawing Sheets

Related U.S. Application Data continuation of application No. 15/268,255, filed on Sep. 16, 2016, now Pat. No. 9,591,360, which is a continuation of application No. 14/819,107, filed on Aug. 5, 2015, now Pat. No. 9,450,996, which is a continuation of application No. 13/842,478, filed on Mar. 15, 2013, now Pat. No. 9,135,636, which is a continuation of application No. 11/680,407, filed on Feb. 28, 2007, now Pat. No. 8,554,940, which is a division of application No. 10/051,406, filed on Jan. 18, 2002, now Pat. No. 7,191,244, which is a continuation-in-part of application No. 09/838,993, filed on Apr. 20, 2001, now Pat. No. 7,054,949, which is a continuation-in-part of application No. 09/766,519, filed on Jan. 19, 2001.

(60) Provisional application No. 60/263,044, filed on Jan. 19, 2001.

(51) Int. Cl.

| | |
|---|---|
| *H04L 29/08* | (2006.01) |
| *H04N 21/462* | (2011.01) |
| *H04N 21/81* | (2011.01) |
| *H04L 29/06* | (2006.01) |
| *H04N 21/458* | (2011.01) |
| *H04L 12/913* | (2013.01) |
| *H04N 21/4623* | (2011.01) |

(52) U.S. Cl.
CPC ........ *H04L 65/4092* (2013.01); *H04L 65/602* (2013.01); *H04L 67/18* (2013.01); *H04L 67/2838* (2013.01); *H04L 67/303* (2013.01); *H04L 67/306* (2013.01); *H04N 21/458* (2013.01); *H04N 21/4622* (2013.01); *H04N 21/4623* (2013.01); *H04N 21/812* (2013.01)

(58) Field of Classification Search
CPC . H04L 67/2838; H04L 67/306; H04L 67/303; H04L 67/18; H04L 47/724
See application file for complete search history.

(56) References Cited

U.S. PATENT DOCUMENTS

| | | | | |
|---|---|---|---|---|
| 6,968,364 | B1* | 11/2005 | Wong | H04N 5/765 709/217 |
| 7,146,627 | B1* | 12/2006 | Ismail | H04H 60/06 725/47 |
| 7,590,681 | B1* | 9/2009 | Chang | H04L 67/18 709/203 |
| 7,673,315 | B1* | 3/2010 | Wong | H04N 5/44543 386/254 |
| 7,882,207 | B1* | 2/2011 | Titmuss | H04W 8/082 709/217 |
| 7,904,333 | B1* | 3/2011 | Perkowski | G06F 17/30879 705/14.4 |
| 7,979,881 | B1* | 7/2011 | Wong | H04N 5/44543 725/51 |
| 2001/0042107 | A1* | 11/2001 | Palm | H04L 65/4084 709/218 |
| 2002/0087975 | A1* | 7/2002 | Schlack | H04H 20/10 725/34 |
| 2003/0204854 | A1* | 10/2003 | Blackketter | H04N 7/088 725/113 |

* cited by examiner

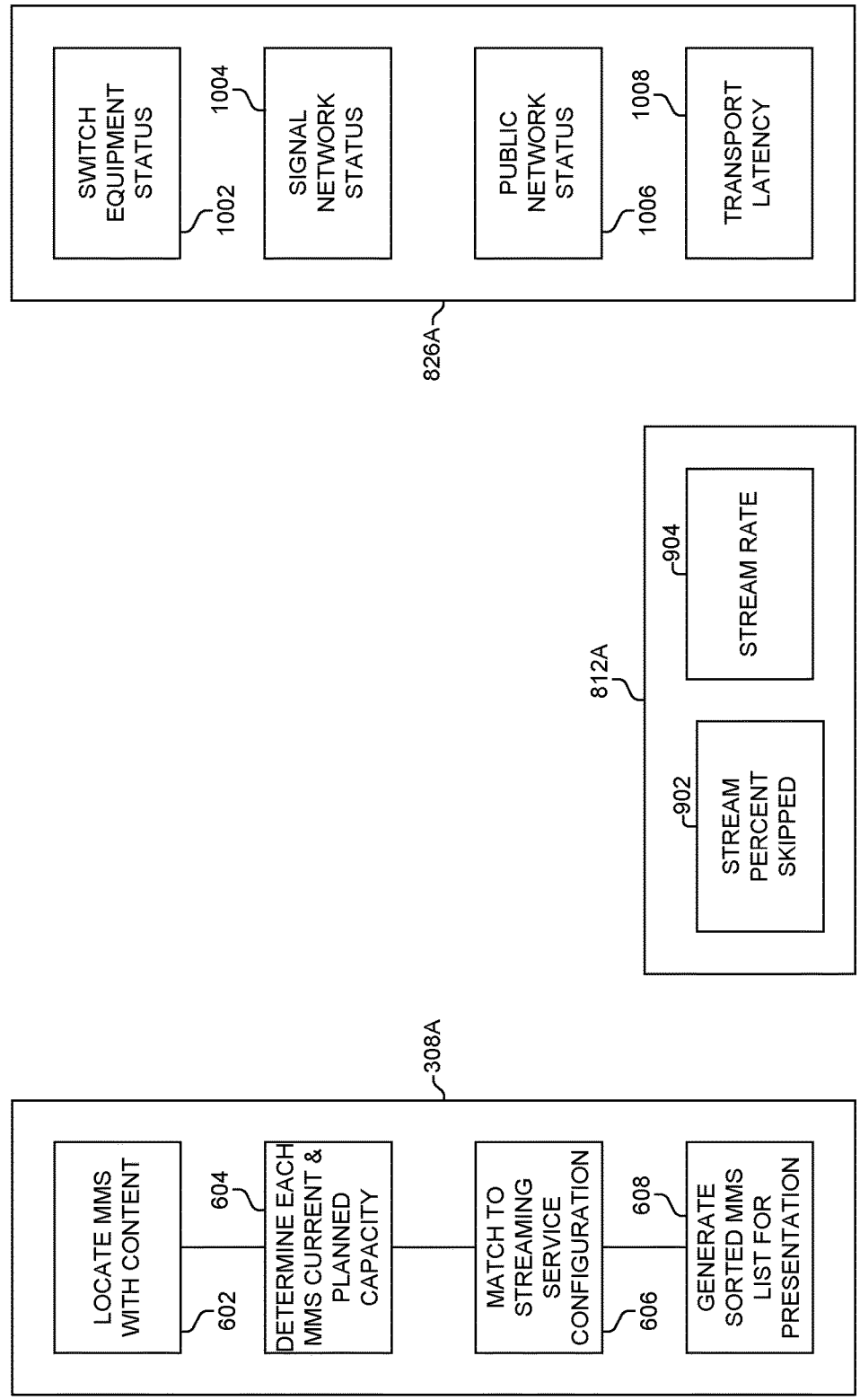

FIG. 11

TREATMENT TABLE ACCESS POINT 1102

| TABLE NUMBER | TABLE NAME | INCOMING ACCESS | INCOMING ACCESS CONTROL | SWITCH IDENTIFICATION & SELECTION | OUTGOING ACCESS CONTROL | OUTGOING ACCESS |
|---|---|---|---|---|---|---|
| 804 | ACTIVE RESERVATIONS | X | | | | X |
| 806 | NETWORK ACCESS | | | | | |
| 808 | SIGNAL MAPPING | | X | | X | |
| 810 | SIGNAL ACCESS POINT | | X | | X | |
| 812 | STREAM CONTROL | | X | | | |
| 816 | REFERRING HOST | | | X | | |
| 818 | EXCEPTION | | | X | | |
| 820 | PERSONAL IDENTIFICATION NUMBER | | | X | | |
| 822 | CONTENT SCREENING | | | X | | |
| 824 | CONTENT LOCATION | | | X | | |
| 826 | NETWORK STATUS | | | X | | |
| 828 | DAY OF YEAR | | | | | |
| 830 | DAY OF WEEK | | | | | |
| 832 | TIME OF DAY | | | | | |
| 834 | SIGNAL ROUTE CHOICE | | | | X | |
| 836 | CLASS OF SERVICE | | | | X | |

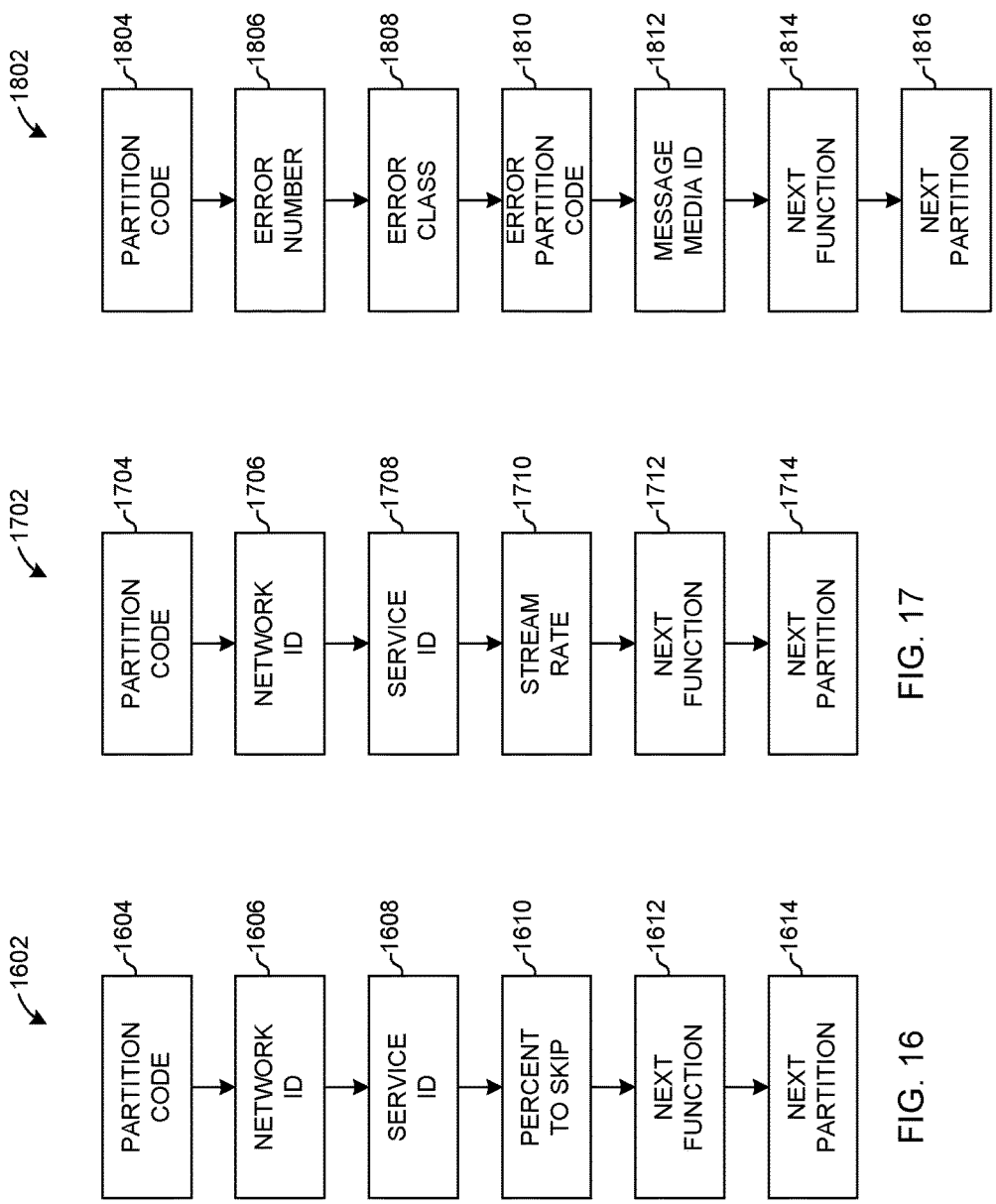

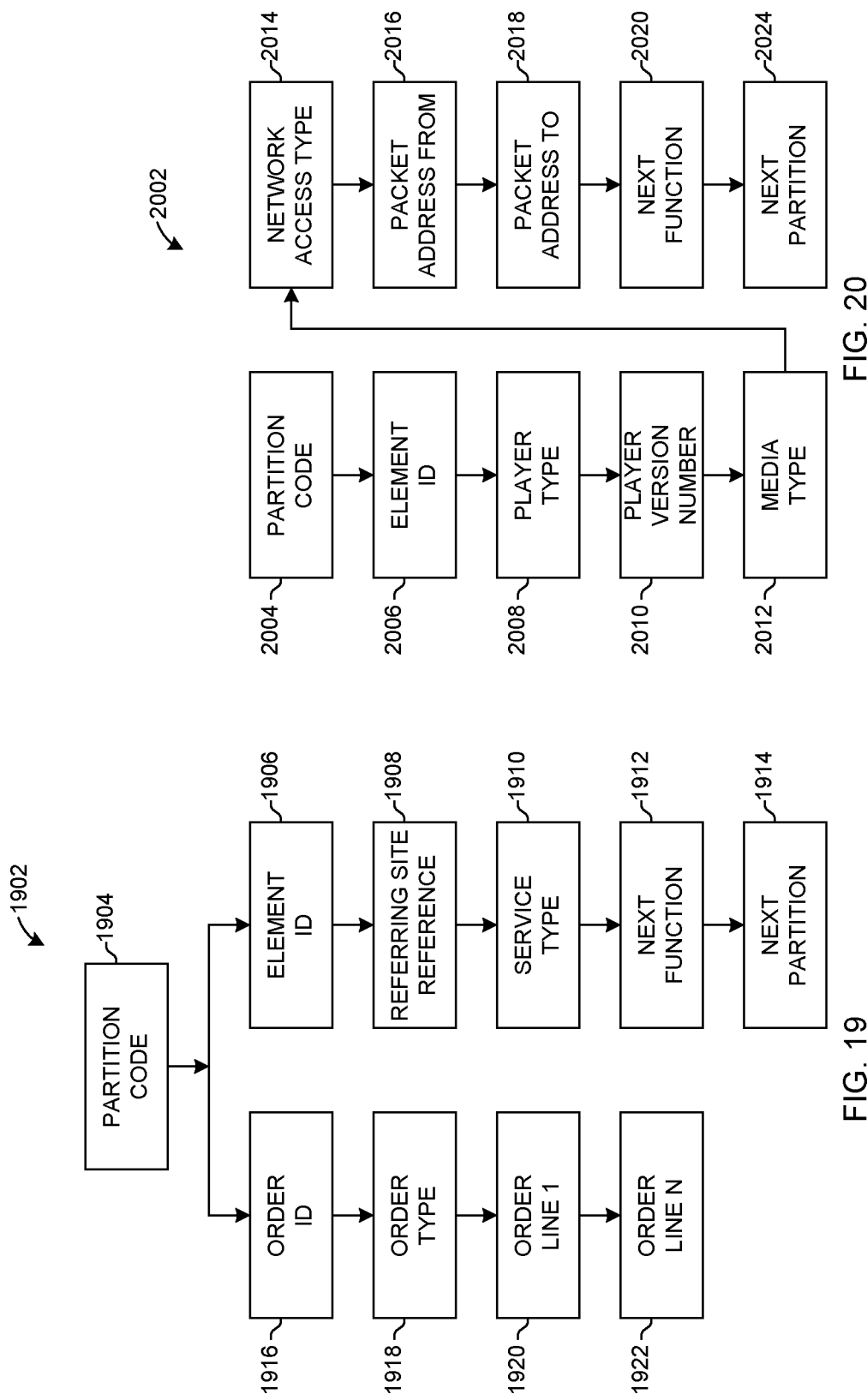

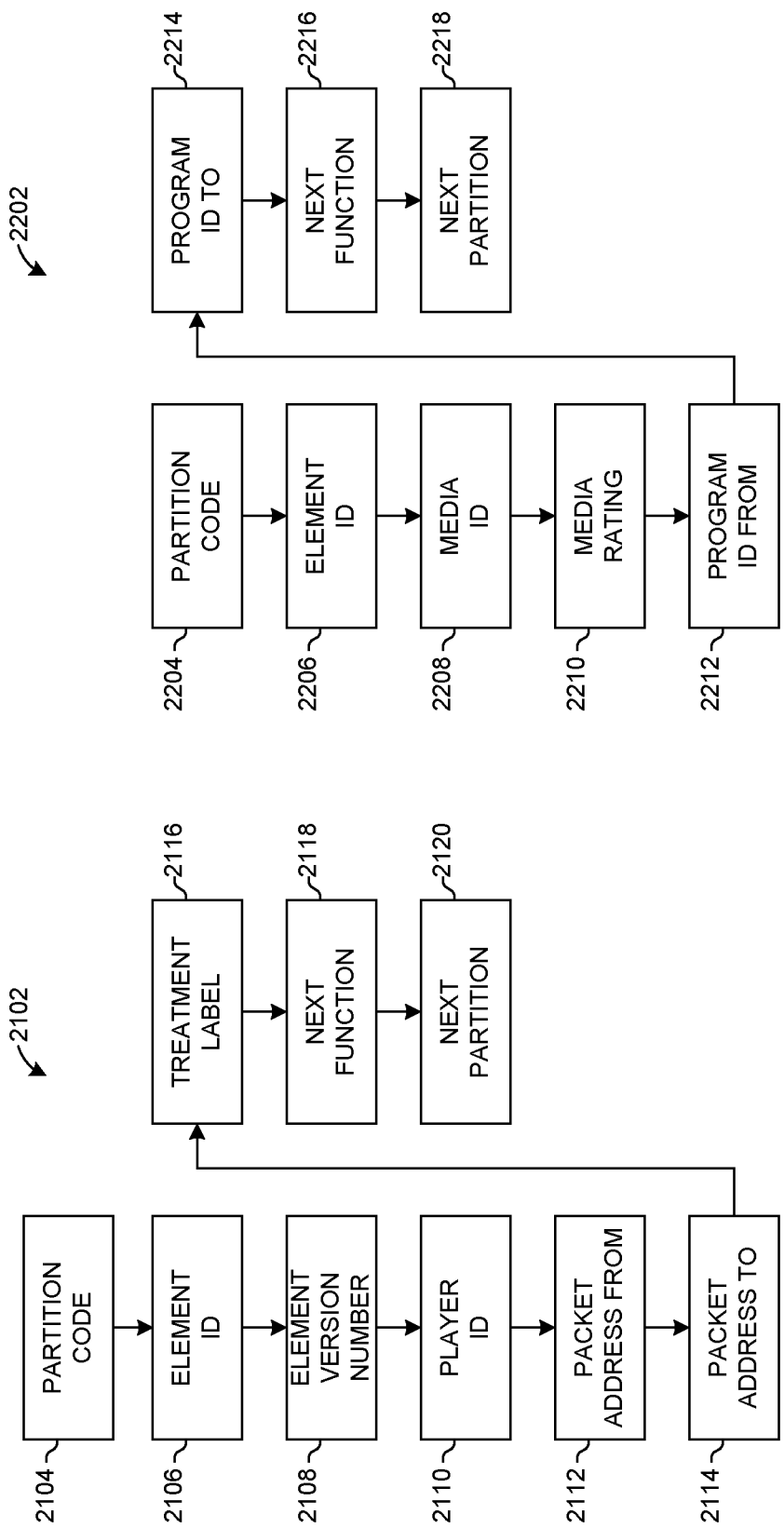

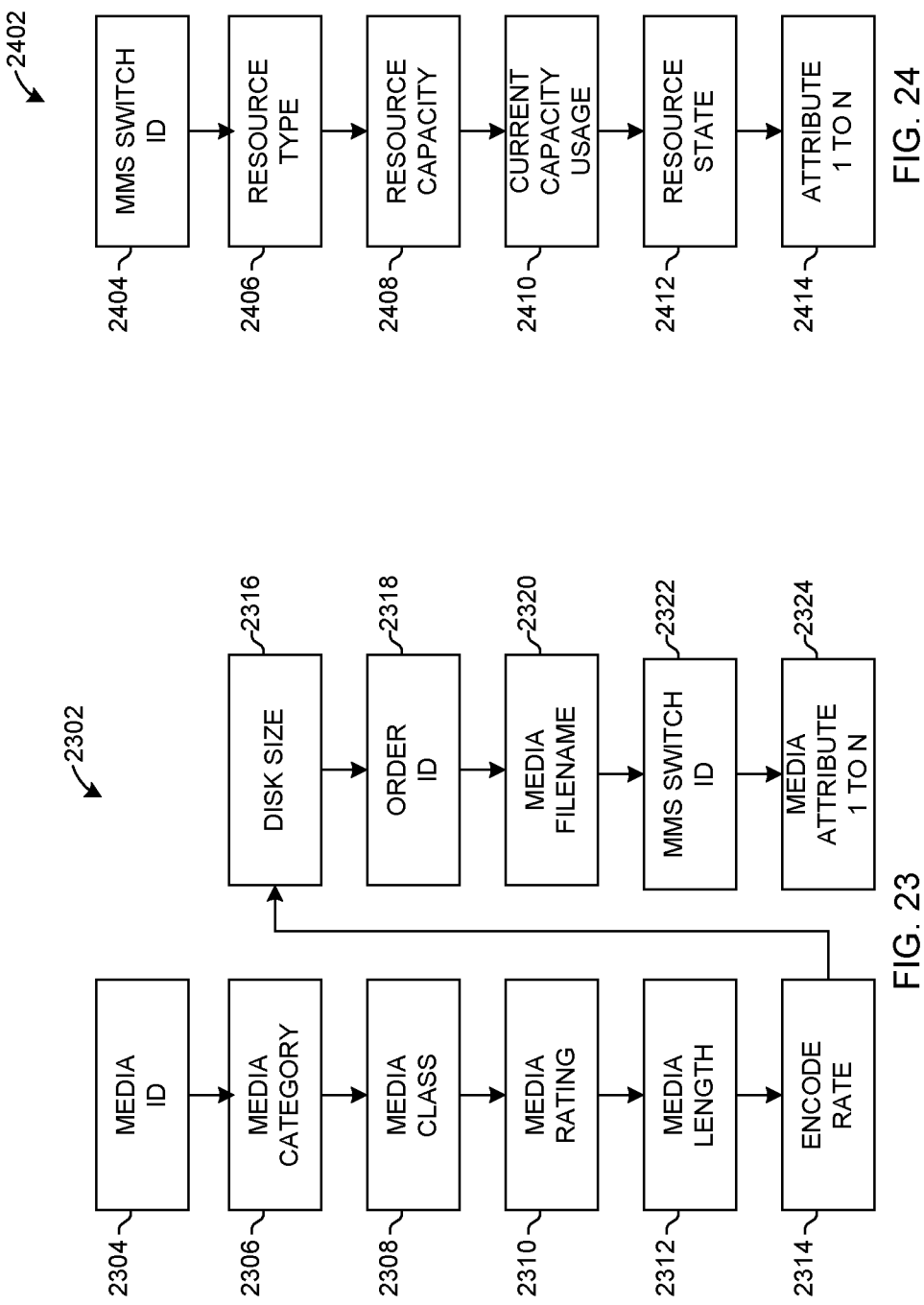

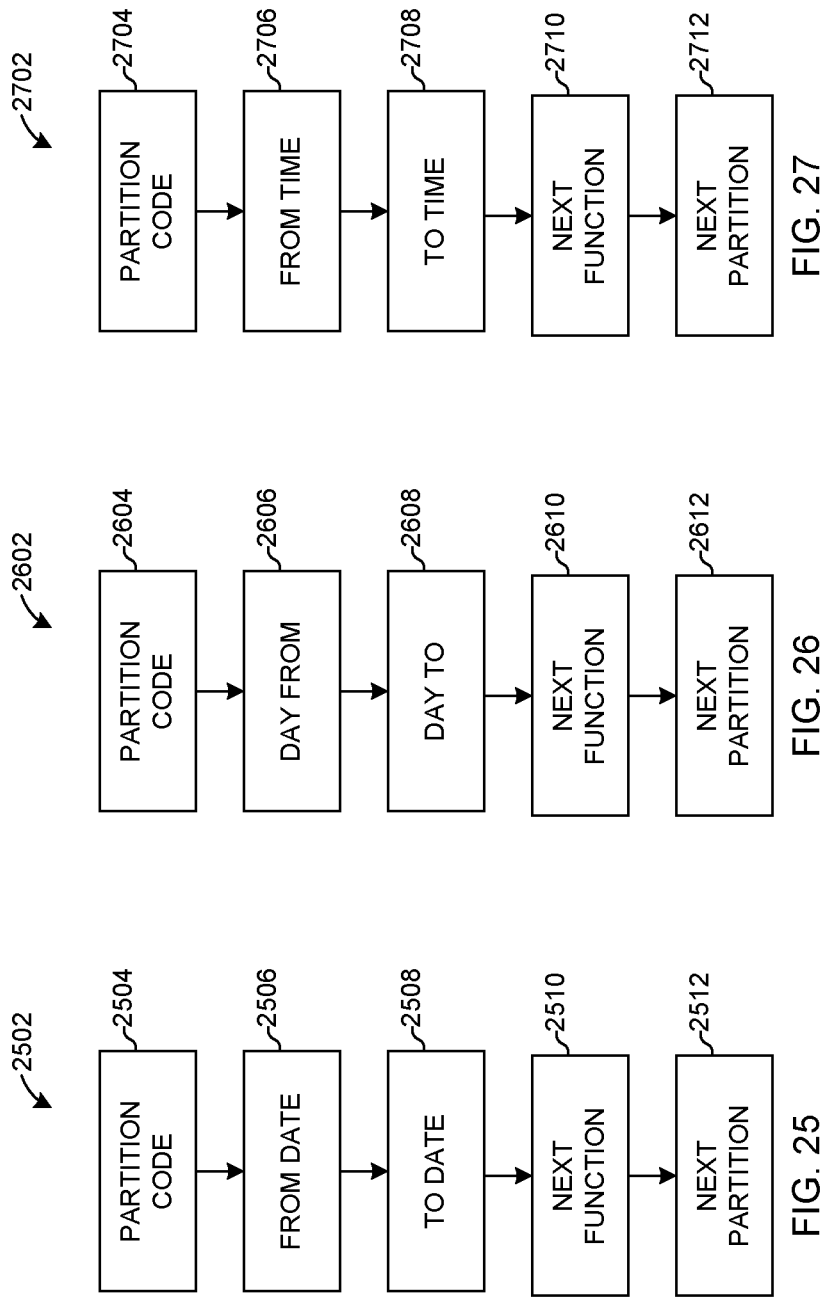

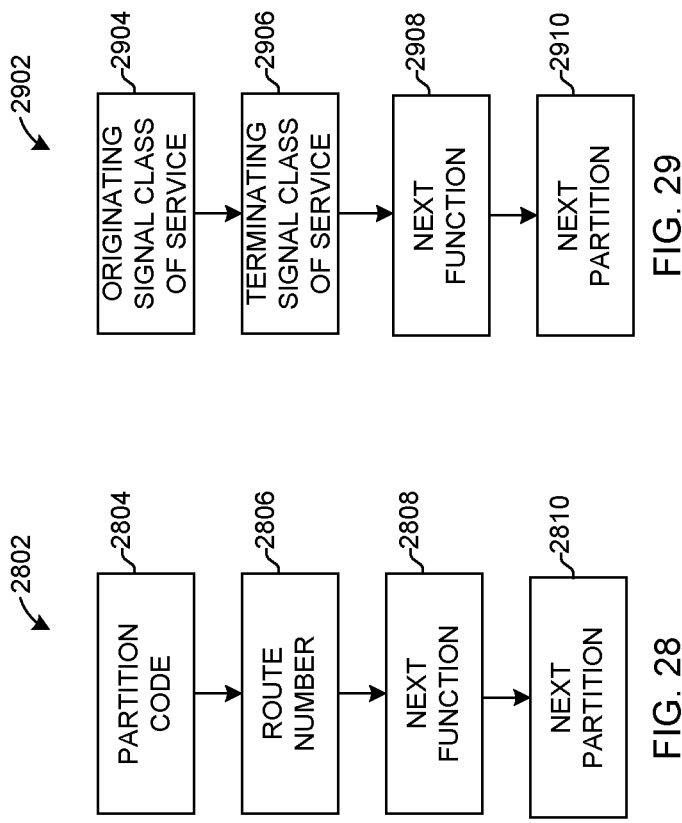

SYSTEM AND METHOD FOR ROUTING MEDIA

RELATED APPLICATIONS

The present application is a continuation of U.S. patent application Ser. No. 15/451,198, filed Mar. 6, 2017, (now U.S. Pat. No. 9,756,362, issued Sep. 5, 2017) and entitled System and Method for Routing Media, which is a continuation of U.S. patent application Ser. No. 15/268,255, filed Sep. 16, 2016, (now U.S. Pat. No. 9,591,360, issued Mar. 7, 2017) and entitled System and Method for Routing Media, which is a continuation of U.S. patent application Ser. No. 14/819,107, filed Aug. 5, 2015, (now U.S. Pat. No. 9,450,996 issued Sep. 20, 2016) and entitled System and Method for Routing Media, which is a continuation of U.S. patent application Ser. No. 13/842,478, filed Mar. 15, 2013, (now U.S. Pat. No. 9,135,636, issued Sep. 15, 2015) and entitled System and Method for Routing Media, which is a continuation of U.S. patent application Ser. No. 11/680,407, filed Feb. 28, 2007, (now U.S. Pat. No. 8,554,940, issued Oct. 8, 2013) and entitled System and Method for Routing Media, which is a divisional of U.S. patent application Ser. No. 10/051,406, filed Jan. 18, 2002, (now U.S. Pat. No. 7,191,244, issued Mar. 13, 2007) and entitled System and Method for Routing Media, which is a continuation-in-part of U.S. patent application Ser. No. 09/838,993, filed Apr. 20, 2001, (now U.S. Pat. No. 7,054,949, issued May 30, 2006) and entitled System and Method for Streaming Media, which is a continuation-in-part of U.S. patent application Ser. No. 09/766,519, filed Jan. 19, 2001, entitled System and Method for Streaming Media, the entire contents of which all are incorporated herein by reference; and U.S. patent application Ser. No. 10/051,406, filed Jan. 18, 2002, takes priority to U.S. Patent Application Ser. No. 60/263,044, filed Jan. 19, 2001, entitled Media Routing Algorithm, the entire contents of which all are incorporated herein by reference.

FEDERALLY SPONSORED RESEARCH OR DEVELOPMENT

Not Applicable.

COMPACT DISK APPENDIX

Not Applicable.

FIELD OF INVENTION

The present invention is related to the fields of management and administration of media streaming.

BACKGROUND OF THE INVENTION

Real time transport of audio, video, and other data commonly referred to as "media" may be manipulated and rendered using computers and/or digital appliances, such as a set top box. A digital appliance is a product that uses computer based technology and/or a telecommunication network or other packet based network to access, retrieve, interact with, report, and/or handle media or other information.

As computers and computer based appliances gain popularity, the demand for digital media streaming services also increases. This occurs, for example, because digital media streaming can be used to create enhanced consumer and business services. For example, a manufacturer of a refrigerator may install a digital appliance that connects the refrigerator's digital appliance to the Internet. A consumer can use the refrigerator's digital appliance to receive digital audio/video explaining how to prepare a favorite recipe.

The digital appliances and other computers can use real time media streaming services to render media while it is streamed from the media's server computer. Real time media streaming often is preferred over pure downloading since media streaming permits a consumer to view video and/or hear audio shortly after it is requested instead of waiting for a delayed download of the complete media and a subsequent playing of the media by the digital appliance.

Real time media streaming is difficult to implement on diverse networks, such as the Internet, corporate private networks, corporate intranets, and other packet based networking solutions. This is because real-time media applications typically are resource intensive and lack sufficient state control models to ensure proper quality of service.

Enhanced media streaming services generally compound the difficulties because multiple digital media streams are transmitted for enhanced services instead of a single digital media stream, such as for non-enhanced services. In the instances of enhanced services, current technologies treat each digital media stream as an individual session with little or no association to the viewer. Moreover, existing digital media streaming devices focus on the technical transmission and delivery of media, and place little control over the viewer management and media content management. Finally, the current streaming video networks lack sufficient notions of network-wide and multi-level resource allocation and control, trouble detection and automatic fail-over transparent to the viewer, and sophisticated anti-spoofing, denial of service prevention, and unauthorized access prevention techniques.

SUMMARY OF THE INVENTION

In one aspect, a method for managing streaming of video content to a client device includes providing the video content to a content distribution network for storage in a plurality of geographically separated resources of the content distribution network and receiving, from the client device via a packet-based telecommunication network, signaling to have the stored video content streamed to the client device. In response to the received signaling, one or more files are transmitted to the client device via the packet-based telecommunication network, each of the one or more files being in a format compatible with a media player on the client device, the one or more files comprise (i) an identification of one or more of the resources of the content distribution network available to facilitate streaming of one or more segments of the stored video content to the client device, the identification being dependent at least in part on a relationship between a geographic location of the client device and geographic locations of the resources of the content distribution network, and (ii) an identification of an advertising server, the identification of the advertising server being dependent at least in part on a relationship between the geographic location of the client device and a geographic location of the advertising server, wherein the one or more files, when processed by the client device, cause the client device to communicate with the identified one or more resources of the content distribution network and the advertising server to cause the one or more segments of the stored video to be streamed to the client device by the identified one or more resources of the content distribution network and cause one or more advertisements to be streamed from the advertising server to the client device.

In another aspect, a method for managing streaming of video content to a client device includes providing the video content to a content distribution network for storage in a plurality of geographically separated resources of the content distribution network and receiving, from the client device via a packet-based telecommunication network, signaling to have the stored video content streamed to the client device. In response to the received signaling, one or more files are transmitted to the client device via the packet-based telecommunication network, each of the one or more files being in a format compatible with a media player on the client device, the one or more files comprising (i) an identification of a first resource of the content distribution network available to facilitate streaming of the stored video content to the client device, the identification being dependent at least in part on a relationship between a geographic location of the client device and geographic locations of the resources of the content distribution network and (ii) an identification of an advertising server, the identification of the advertising server being dependent at least in part on a relationship between the geographic location of the client device and a geographic location of the advertising server, wherein the one or more files, when processed by the client device, cause the client device to communicate with the first resource of the content distribution network and the advertising server to cause the stored video to be streamed to the client device by first resource of the content distribution network and cause an advertisement to be streamed from the advertising server to the client device. The method includes monitoring a level of service for the streaming of the stored video to the client device by the first resource of the content distribution network. Upon detection of a degradation of the level of service, an identification of a second resource of the content distribution network available to facilitate streaming of a remaining portion of the stored video content is transmitted to the client device, via the packet-based telecommunication network, to cause the client device to communicate with the second resource of the content distribution network to cause the stored video to be streamed to the client device by the second resource of the content distribution network instead of the first resource of the content distribution network.

BRIEF DESCRIPTION OF THE DRAWINGS

FIG. 6 is a block diagram of the routing engine for a name routing processor in accordance with an embodiment of the present invention.

FIG. 9 is a block diagram of a stream control table in accordance with an embodiment of the present invention.

FIG. 10 is a block diagram of a network status table in accordance with an embodiment of the present invention.

FIG. 11 is a table diagram of treatment table access points in accordance with an embodiment of the present invention.

FIG. 16 is a block diagram of a stream percent skipped table in accordance with an embodiment of the present invention.

FIG. 17 is a block diagram of a stream rate table in accordance with an embodiment of the present invention.

FIG. 18 is a block diagram of a treatment table in accordance with an embodiment of the present invention.

FIG. 19 is a block diagram of a referring host table in accordance with an embodiment of the present invention.

FIG. 20 is a block diagram of an exception table in accordance with an embodiment of the present invention.

FIG. 21 is a block diagram of a personal identification number table in accordance with an embodiment of the present invention.

FIG. 22 is a block diagram of a content screening table in accordance with an embodiment of the present invention.

FIG. 23 is a block diagram of a content location table in accordance with an embodiment of the present invention.

FIG. 24 is a block diagram of a network status table in accordance with an embodiment of the present invention.

FIG. 25 is a block diagram of a day of year table in accordance with an embodiment of the present invention.

FIG. 26 is a block diagram of a day of week table in accordance with an embodiment of the present invention.

FIG. 27 is a block diagram of a time of day table in accordance with an embodiment of the present invention.

FIG. 28 is a block diagram of a signal route choice table in accordance with an embodiment of the present invention.

FIG. 29 is a block diagram of a class of service table in accordance with an embodiment of the present invention.

DETAILED DESCRIPTION

Figure 1:
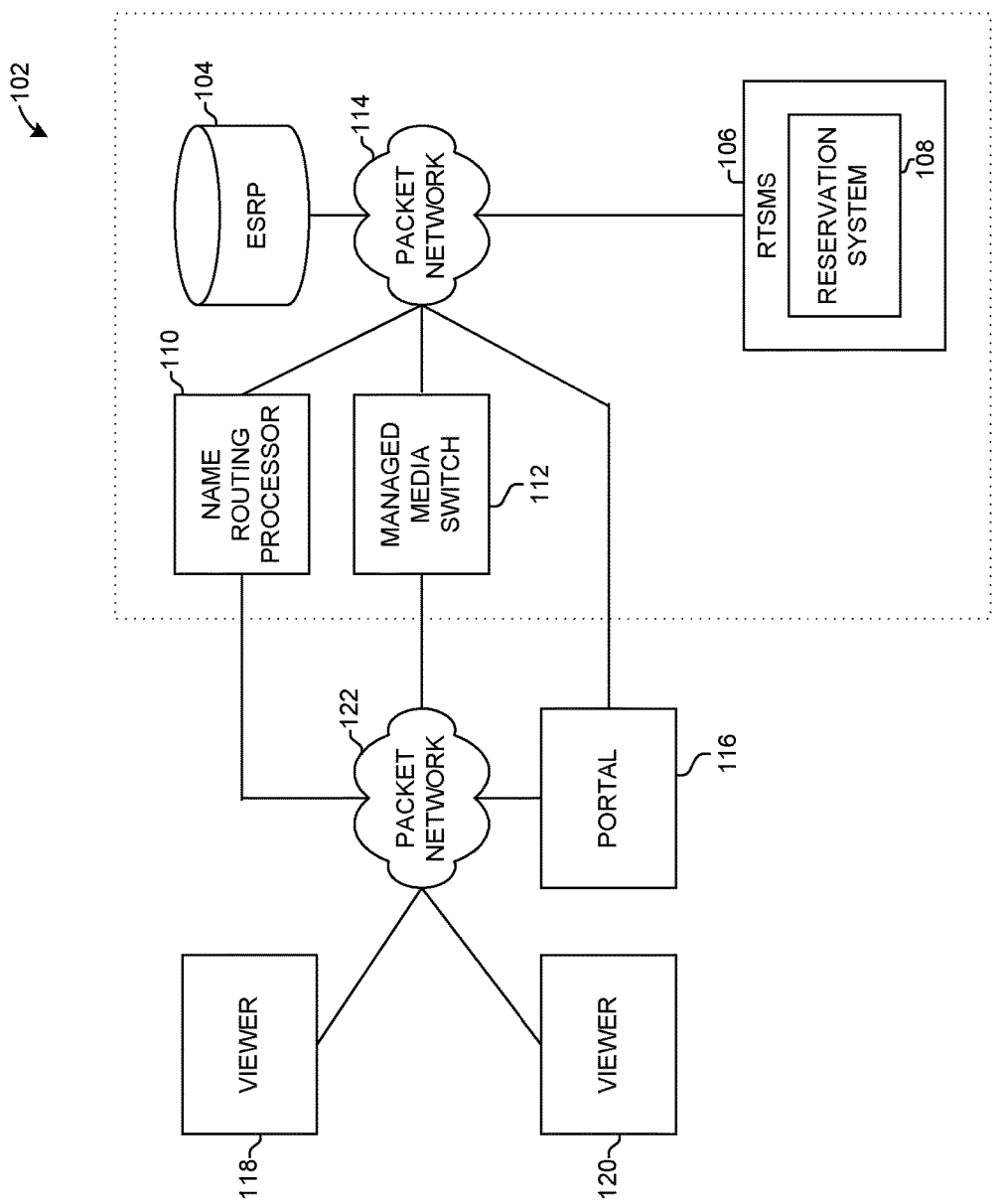
FIG. 1 is a block diagram of a streaming system in accordance with an embodiment of the present invention.

Media streaming, both live and on-demand, also provides an environment for viewers to experience multimedia by establishing a logical, one-to-one connection between the media and the audience (a "session"). Sessions enable a rich media, interactive experience and provide a foundation for a reliable streaming service platform. Media may include audio, video, images, moving text messages such as stock ticker tapes, and other data. Media may include one or more media clips or a part of a media clip. A session may include an internet protocol session, a broadband connection, or other session parameters. For simplicity, "session" may be used in some instances to mean only an internet protocol (IP) session, only a broadband connection, or both, depending on verbiage. In a different embodiment, more than one session can exist to a given audience member simultaneously. However, improved systems and methods are needed for implementing control features, such as real time routing of requests for media service, dynamic matching of content to the viewer, and enforcement of media content owners' rights and distribution criteria.

In one embodiment, the present invention is directed to an overall integrated and distributed media routing algorithm (MRA) that correlates the diverse needs of a media content owner and/or an agent ("content owner" or "media owner"), a packet distribution network owner, one or more viewers, and the health of a network traversed in the media delivery process. The MRA enables the content owner to control who views its content and what content is actually streamed for viewing. In another embodiment, the MRA enables a network owner to efficiently control the network and its devices to maximize quality of service while enabling the devices to respond automatically and transparently to viewer problems.

In another embodiment, the present invention enables content owners to create viewing programs that can be targeted at viewers based on the amount of information known about an individual viewer. The content owner may create a program having one or more media items. A viewer may desire to receive one or more of the media identified in the program. The viewing programs and viewer information may be used to dynamically create a presentation tailored for that viewer. For example, the presentation may contain a list of media from the program, possibly with or without one or more other media items, that is to be streamed to the viewer and that is combined to make a single viewing experience. In another example, a movie trailer followed by a full-length movie may combine two different media to make a simple program.

A program, however, can contain media selectors that identify a set of media. A media selector is used in the presentation creation process when the content owner desires to target different media at an audience, based on audience characteristics, and to create different presentations for different groups of audiences. Examples of audience characteristics may include the individual's sex, age, hobbies, historical viewing habits, or other data the viewer would provide.

In another embodiment, systems and methods of the present invention control a state model, such as a basic streaming state model (BSSM), for streaming media through enhanced communications between communication devices coupled over disparate packet networks, such as the Internet, intranets, virtual private networks, cable systems, frame relay networks, asynchronous transfer mode (ATM) networks, satellite networks, and/or any combination of inter-connected, data communication networks.

The state model data identifies a viewer using a reservation, identifies the switch or switches from which media is streamed, the media that is streamed, the duration the media is streamed, and other state changes in the streaming, such as whether a stream is paused, canceled, forwarded, or reversed. If a presentation is streamed, the state model data identifies the presentation and the media in the presentation. The state model data includes stream state changes, viewing session state changes, device mode changes from a switch or signaling routing processor and error and alarm conditions for any switch, signaling routing processor, management system, service routing processor, or other communication device in the streaming system. A state model is kept for each NRP and each MMS as described more fully below. Multiple levels of the BSSM enable event generation, tracking information, and storing information for transitions within a presentation from its initial generation to its completion or termination.

FIG. 1 depicts an exemplary embodiment of a streaming system of the present invention. The streaming system 102 of FIG. 1 comprises a service processor, a management system, a reservation system, a routing processor, and a media switch, such as an enhanced service routing processor (ESRP) 104, a real time switch management system (RTSMS) 106, a reservation system 108, a name routing processor (NRP) 110, and a managed media switch (MMS) 112, respectively, each communicating through a packet network 114. A portal 116 may communicate with the reservation system 108 of the RTSMS 106 via the packet network 114, and one or more viewers 118 and 120 may communicate with the NRP 110, the MMS 112, and/or the portal 116 via a packet network 122.

The streaming system 102 has a network owner that controls the streaming system and controls what entities use network operators to perform work on the streaming system. For example, a network provider may build a streaming system and sell streaming services to a publishing customer. The network provider is the network owner. The network owner and the publishing customer sell a product, i.e. media, to customers via a website or a contract with a web portal using the streaming system.

In some instances, the publishing customer also may be the network provider. This may occur, for example, where a corporate enterprise is streaming media to its employees or customers directly. Other examples exist.

Identifying the network owner of the streaming system 102 or another network enables the streaming system to track legal, financial, contractual, and service auditing issues associated with crossing signaling and/or other communications, such as media, from one network to another. For example, a first streaming network and a second streaming network may agree to inter-connect their networks to build a large viewing audience. This may occur, for example, if a media owner desires as many viewers as possible to see its media, and the media owner is less concerned with what network owner the viewer uses to receive the media.

In this example, the first network owner and the second network owner may agree on a revenue sharing, based on what the viewer receives, and the revenue generated from that viewer receiving the media may be split according to the revenue sharing agreement. In this example, the first network owner and the second network owner cannot control each other's service, network distribution rules, and/or other routing or operational processes. Thus, the first network owner and the second network owner are required to agree on the revenue sharing and how their networks will inter-connect in order to provide distribution of media and receive revenue based on that distribution.

The streaming system 102 also enables a media owner to identify a program or a portion of a program that is made available for streaming. The program typically identifies the sequencing, whether sequential, parallel, timing, or other, in which media clips are to be streamed, where the media clips are to be placed, and, in some instance, to whom the media clips can be transmitted.

A program may have a list of media, an order, and/or other media rules. The program may also have program creation rules and/or program routing rules. Network distribution rules generated by the owner and/or operator of the streaming system 102 (hereafter, "network owner") or one or more other packet network suppliers also may be associated with the program. The network distribution rules, the media list, the order, and any other special media rules, such as program creation rules and/or program routing rules, govern the transmission of the media for a program.

Program creation rules are defined by a media owner. Program creation rules may identify if a program can be created from one or more other programs and how the one or more other programs may be combined. For example, a program may have program creation rules identifying which individuals are allowed to alter the program rules, listings of identifications of other media owners that have agreed to share media, and other administrative data.

Program routing rules are defined by the media owner. Program routing rules define where and/or how media may be routed. Program routing rules may be superceded by network distribution rules.

Network distribution rules are defined by the network owner and/or one or more other packet network suppliers. Network distribution rules are used to manage capacity, load, bandwidth, switch resources, and/or other events and/or resources, including resources for sessions and connections. For example, a program can be configured to stream ten minutes of a sitcom based media, insert an advertisement, and then return to the sitcom based media. The publisher may define the program rules to transmit greater than 30 frames per second, but the network distribution rules may be restricted to 30 viewing frames per second by the network supplier. The program would not be streamed since it violated the network distribution rules. The network distribution rules may manage and/or identify resources needed to transfer media between the streaming system 102 and one or more other packet networks.

The media list may include one or more different media references identifying one or more media clips and one or more different types of media. For example, the media list may contain media names or other media references. The media list may include references to one or more of recorded media, live media, a media alias, a media selector including an advertising selector, and/or other media.

Recorded media typically directly references a media file name. Live media typically has connection instructions to a live ingress switch. A media alias typically references one or more other media clips. A media selector typically contains rules identifying how to select one or more of several possible media clips. An advertising selector is a type of media selector used to select an advertising media clip.

Each type of media may contain one or more of the above-stated identifiers or other identifiers. Additionally, each media clip may have a title assigned to it by the media owner.

An order is a request by a paying or collecting entity for the network owner to provide some sort of streaming or related service, such as storage. Typically, the order is made by a paying or collecting entity, such as a publisher, another streaming network service provider, a viewer, a private company, an advertising service, or another entity that desires to enter into a contract with the network owner for streaming service or related services, such as real time usage reporting.

An order may be associated between multiple entities. For example, a publisher may be primarily responsible for payment to the network owner for streaming services, but an advertiser has agreed to pay the network owner based upon the number of people viewing their ads. Thus, two paying entities and one collecting entity are associated with the order. In this example, an entity can be both a paying entity and a collecting entity. For example, a publisher can pay for streaming services and also collect a portion of the fee generated by streaming media.

An order can contain several order components, such as service billing rules, storage billing rules, collection rules, viewing rules, settlement rules, and other fiscally important information. This fiscal information allows a network owner to generate an invoice for streaming services rendered. The associated invoiced revenue may be collected based on the fiscal information, and other collection entities, such as publishers and other networks, may be paid based on that fiscal information.

Service billing rules normally are related to making the media available for viewing. Multiple media items can be associated to a single service rule. Service rules allow the publisher to describe to the network owner how the media viewing will be paid. For example, pay-per view media may require the viewer to pay for the service. A fee for service may require the publisher to pay a fee based on the number of data bytes transmitted to all viewers for a defined period of time. An advertising revenue share may require the network owner to collect a percentage of the advertising revenue generated by the program being viewed. Other payment methods and combination of payments may be used.

An order also can contain storage rules for determining where the media or program will be located and the costs associated with the physical storage of the media. Storage rules allow the publisher to target media to MMS locations that they believe will provide the most streaming service. For example, advertising media that is localized to the mid-west of the United States of America could be located on only MMSs within that region. Storage rules can specify a single MMS device, an offline storage location that is not attached to any MMS, multiple MMS devices, all MMS devices, and other networks that can provide the same media, if needed. Storage rules also allow the network owner to bill for the amount of storage a publisher uses on a periodic basis, such as an average daily storage use. A storage order can have multiple media and programs attached to it.

An order may contain collection rules identifying which entity or entities are collecting a payment for services rendered. For example, a service rule that designates pay-per-view might require an immediate credit card payment by the viewer. The collection rule may identify the credit card collection agency, collection account, and other vital settlement data for the processing of the viewer's credit card. In another example, the viewer may select pay-per-view and simply be billed the amount on their monthly cable bill. Collection rules also apply to the invoicing of charges to corporate type accounts, such as how soon payment is due after the invoice is printed. Collection rules focus on receiving the payment portion of the transaction. Multiple collection rules may be applied to a single order.

An order may contain viewing rules for the media and/or programs that are attached to it. Viewing rules associated with an order allow the publisher to determine who sees the media or program based on the viewer's account status. For example, a viewing rule for a subscription based service in which a viewer is 90 days or more behind in payments might block the service.

In another example, if a viewer selects a pay-per-view media item that requires a credit card payment, and the credit card collection agency returns a code declaring the card is over its limit, the viewing rule might block the service. Order viewing rules typically are associated to a credit rating or current collection status of an account for the person requesting to view the media or the publisher wishing to make the media available for distribution.

An order can contain settlement rules for determining how collections are divided and which entities participate in the settlement. For example, a program may be created by a publisher in which advertisers agree to pay the publisher and the network owner for targeting their advertising to a specific set of viewers. The viewer is allowed to view the program free of charge, except the viewer will receive advertisements. The settlement rules would describe the agreed upon advertising rates that will be applied on a per viewer basis, the percentage or fixed fee being supplied to the network owner for each viewer, and other settlement data.

There may be a many-to-many relationship between an order and a program. That is, one program or multiple programs may appear in a single service order, and a single program may appear in a one order or multiple orders. For example, in the former instance, an order may associate multiple programs that are the publisher's $4.99 pay-per-view programs for distribution in the United States. Whereas, in the latter instance for example, a single program may be associated with one order for pay-per-view customers and another order for subscribers.

In some embodiments, the program has a program identification. The program identification may be used to track use of the program, such as how many times the media for a program is streamed and the number of users receiving that program. Additionally, the program identification may be used to track other attributes associated with the program, such as viewer attributes associated with the viewer receiving the media, streaming times, other media or programs streamed with a particular program, and/or other tracking purposes.

When a program and its order are complete, it may be published. Publishing is the act of making a program available on the streaming network 102 for distribution to one or more viewers via a switch, such as the MMS 110.

After a program is published, a presentation may be generated based on the program. A presentation results from applying a viewer profile to a program, including the program's order and any other media rules, at the time a reservation is made for the program by the viewer. A viewer profile may be any set of attributes of interest for a viewer and their values. Thus, the presentation typically is customized for an individual viewing session, and the program and the viewer profile are what are used to generate the presentation.

The presentation may identify the media to be streamed to a viewer for the requested program and the resources needed to stream the media. The presentation also may include special instructions, such as special media sequencing instructions, late binding media instructions, and/or special routing instructions.

In one embodiment, the presentation contains one or more program identifications. The program identification may be used to track one or more programs identified for the presentation and/or other attributes for the viewer, the resources used for the presentation or its streaming, reporting associated with the program or other media or programs associated with the program, and/or other purposes. For example, a viewer may attempt to view multiple programs within a single reservation. However, a media owner for one of the programs may want reports identifying how many people received the program and the statistics for that streaming. Therefore, the program identification is used to provide tracking and reporting on the program level, as opposed to the reservation level. The program identification enables the streaming system 102 to track and report individual programs and their usage.

The presentation typically is transmitted to an NRP in a reservation along with the reservation identification. In some instances, the viewer profile and/or a reservation window may be included in the reservation. The reservation window is the starting time and the ending time for which a reservation and the resources for a reservation are valid and available for a viewing session. Preferably, a viewing session should be started and completed within the reservation window. Although, enforcement may be configured as a matter of network owner policy.

At the time a reservation is made for the program by the viewer, a play script also is created. The play script contains a list of one or more media references for the presentation and a reservation identification. In one embodiment, the play script contains one or more universal resource locators (URLs), and each URL identifies a media clip and contains the reservation identification.

The play script may be formatted according to the type of player the viewer is using and may contain information identifying how to contact a resource, such as the MMS 110 or a device on the MMS, to receive the media. In some instances, such as some configurations where the viewer is a set-top box, the device streaming the media to the set-top box may initiate the connection to the set-top box, and information identifying how to connect to the resource is not needed. The play script typically is transmitted to a viewer.

The ESRP 104 enables media owners to place media on the ESRP for distribution to various switches, such as to various multimedia switches in the streaming system 102. The ESRP 104 allows each media owner to create a program for the media, including creating a list of media, with one or more different types of media or one or more different media clips and the media rules to determine the sequence in which the media clips are to be streamed, where the media clips are to be placed, and in some instances to whom the media clips can be transmitted.

The ESRP 104 also enables a media owner and/or a publishing agent of the owner (hereafter "media owner") to generate the settlement rules that define who will be billed or credited when media is transmitted to a viewer or another device and the terms of the bill or credit. For example, a media owner may have a contract with a service provider, and the service provider will share in the revenue generated by viewers viewing the content. Alternately, the media owner may have to pay the service provider for use of an amount of bandwidth when the media is transmitted. In addition, part of the media sent to a viewer may include advertisements, and the media owner can define a rule to bill the advertising entity a dollar amount each time the media is transmitted.

The ESRP 104 also enables a media owner to create special viewing rules and/or routing rules for the program. The viewing rules and/or routing rules may identify any restrictions or other customizations, such as geographic or age restrictions, preferred language, or substitutions on the streaming of the program. For example, if a football game is a program, the game may be blocked from a specific region when the streaming is free, but not blocked if the game is part of a subscription or pay-per-view service. In this instance, the media owner may generate two or more different orders for the same program, and a viewer 118 or 120 would be blocked or not blocked from the program depending on which order the viewer was attempting to use.

The ESRP 104 publishes programs when the programs and the orders for the programs are complete. Thus, when a program and its order are complete, the ESRP 104 may transmit the media identified in the program to one or more switches, such as the MMS 112, according to one or more media rules so that the program is available to be streamed to a viewer. The ESRP 104 also publishes the program, including a program identification, a media list for the program, and the media rules for the program, to the RTSMS 106.

One or more ESRP devices may exist in the streaming system 102. One ESRP is depicted in FIG. 1 for clarity.

The RTSMS 106 accepts programs and their respective orders from the ESRP 104 when the programs are published. The RTSMS 106 determines the switches or other communication devices on which the programs reside. The RTSMS 106 receives the media list, the media rules, the program identification, and any associated orders for the program from the ESRP 104.

The RTSMS 106 receives signaling from a viewer 118 or 120. This signaling may be routed to the RTSMS 106 via a portal 116 or another type of communication device. The initial signaling from the viewer 118 or 120 typically is a request for a program or programs. However, a simple request for an individual media or list of media may be honored in some embodiments.

The RTSMS 106 processes the signaling to determine if the requested program is available (or the media can be found in, and an appropriate match for, a program) and if the program has restrictions applied by the media owner and/or network operator and locates an NRP 110 within the streaming system 102 that is capable of processing the viewer's request. The RTSMS 106 then generates a customized play script for the requested program to the viewer. The play script may include the requested media, such as one or more media clips, and additional media, such as one or more advertisements, either as media clips, banner advertisements, or other types of advertisements. The play script is formatted as the output of a presentation generator process and is formatted for the language/format of the viewer 118 or 120. For example, a viewer 118 or 120 using the Real Network's Real Player may require a synchronized multimedia integrated language (SMIL) file based play scripts, and the play script would be formatted as such.

The RTSMS 106 builds a reservation for the viewer 118 or 120 for the customized play script and temporarily reserves the resources identified by the presentation generator process for use by the viewer 118 or 120. The RTSMS 106 transmits the reservation along with its presentation to the selected NRP 110 and transmits the customized play script to the viewer 118 or 120.

The reservation uniquely identifies the viewer 118 or 120 and the customized play script. In one embodiment, a separate URL identifies each name on a play script for a presentation, and the reservation has a unique reservation identification that is located in each URL. The URLs are transmitted to the viewer 118 or 120 using the play script, and the viewer can use the play script to initiate a session with a switch. A reservation is a feature that enables the streaming system 102 to reserve system resources, such as switches, processors, or media, either now or in the future, to ensure a quality media experience.

The reservation system 108 receives a request from the portal 116 on behalf of the viewer 118 or 120 for viewing a media and/or presentation. The reservation system can receive additional information from the RTSMS 106, such as past history of the viewer 118 or 120 or products/services in which the viewer has used or participated. The incoming request can be tailored by the RTSMS 106 to append any available data it has on the viewer 118 or 120. The incoming data is processed through the program rules to generate the presentation. For example, the viewer 118 or 120 may desire to view a training video for an investment. The RTSMS 106 may append the current financial value of the viewer 118 or 120 and use the media selectors in the presentation's supplemental programs for investment vehicles that are offered.

The reservation system 108 generates the reservation and forwards it to the NRP 110 along with log information. The reservation system 108 generates and maintains the unique identifiers for every request it receives. Requests that are not fully processed also are recorded and logged for record keeping purposes. The reservation system 108 enables the network owner to establish the time period in which a reservation will be valid for the viewer 118 or 120 to completely view the media.

The RTSMS 106 maintains historical, current, and future views of processing tables that reside in all NRPs in the streaming system 102, including the NRP 110. These tables and the associated data stored by the RTSMS 106 enable the NRPs to determine a switch or switches, such as the MMS 112, that can provide the requested program to a viewer 118 and 120.

The RTSMS 106 collects state model data, such as BSSM data, from all NRPs and switches in the streaming system 102, including the NRP 110 and the MMS 112. The state model data identifies a viewer using a reservation, identifies the switch or switches from which it is streamed, identifies the media that is streamed, the duration the media is streamed, and other state changes in the streaming, such as whether a stream is paused, canceled, forwarded, or reversed. If a presentation is streamed, the state model data identifies the presentation and the media in the presentation. The state model data includes stream state changes, viewing session state changes, device mode changes from the NRP 110 and the MMS 112, and error and alarm conditions for any MMS, NRP, RTSMS, ESRP, or other communication devices in the streaming system 102. A state model is kept for each NRP and each MMS as described more fully below.

The RTSMS 106 can be configured to dynamically select advertising or other content. For example, the RTSMS 106 may be configured for use by an investment management company that manages several different funds and has several different analysts associated with each fund. For example, a person using a viewer may have money in funds A and B but not C or D, and the total value of the viewer's ownership in funds A and B is between $100,000 and $200,000. The RTSMS 106 may use the rule set in the monthly fund program to dynamically place media clips that contain the A and B fund managers discussing recent performance, analysts discussing the outlook for the goals of the A and B funds, and advice customized for that investment level in the presentation. Whereas, if the person using the viewer has $50,000 in an IRA in fund C, the RTSMS 106 may use the rule set in the same monthly fund program to dynamically place media clips showing the C fund managers discussing recent performance, analysts discussing the outlook for the fund's goals, and a tax expert discussing the implications of IRA tax law changes that affect IRAs at that level in the presentation.

The ability to dynamically select content can result in a different cost basis for different presentations. For example, in the above examples, expenses of three dollars may be incurred for the A and B analysts' media clips, and revenue of two dollars may be incurred for the C analyst's media clip.

In one embodiment, the RTSMS 106 is configured to dynamically select content using statistical information. The RTSMS 106 also may be configured to bill or credit entities according to order rules and/or the statistical information.

Statistical identification is the determination of the value of one or more different possible attributes of a viewer. For example, statistical identification may be used to create a viewer profile, or attributes from an already created viewer profile may be used for a statistical identification. The identification of viewer could be, for example, that the viewer is within a geographic area, such as a zip code or an NPA-NXX, that the viewer is within an age group, such as 18-23 years, that the viewer can watch movies of a designated media rating, such as PG, PG-13, or Y-14, that the viewer is male or female, the viewer's marital status, what funds the viewer has invested in, what departments the viewer works for, and/or other personal data relevant to the publisher of the program.

In one embodiment, if the program requires statistical identification of the viewer, the RTSMS 106 may look up previously collected information about the viewer. If no information exists, the RTSMS 106 may instruct the portal 116 to collect the required information or supply defaults if the information is not required. If the viewer does not supply the required information, the RTSMS 106 can be configured to reject the viewing request.

The RTSMS 106 provides reporting capabilities. The reports may include near real-time reports of what media is streamed and the associated statistical information, including demographics, on the entire network. The RTSMS 106 may provide network management capabilities, including operational measurement collection, threshold alarming, and trend analysis.

The RTSMS 106 also collects logs and billing data from the ESRP 104, the NRP 110, and the MMS 112. The billing data may include the order data and the reservation data and may include state model data. The logs are a record of the events that have occurred and are viewable and auditable. Logs are generated by many processes, such as one or more media servers on one or more stream casters of one or more MMSs, one or more NRPs, one or more MMSs, one or more portals, and one or more ESRPs.

The RTSMS 106 processes the logs, the billing data, and the state model data and creates a message sequence detail record (MSDR). The MSDR is a collated view of log and state model data for a reservation. The RTSMS 106 creates an MSDR for every reservation by obtaining information from the reservation order log, the MMS 112 logs, and the NRP 110. This typically is accomplished using the reservation identification that is contained in every entry for log and billing data. The MSDR represents a billable event record that will be used for revenue settlement purposes.

The RTSMS 106 processes the MSDRs and creates bills in accordance with the media rules and orders identified in the programs. Logs, state model data, and billing data for a single viewer 118 or 120 may come from more than one NRP, more than one MMS, and more than one ESRP.

The RTSMS 106 collates all of this data into a single MSDR for a reservation identifying the viewer 118 or 120 using the reservation data and the state model data. By using reservation data for a viewer 118 or 120 and/or a program, the streaming system 102 is able to service a media request from more than one switch or more than one stream caster on a switch. Prior systems could not adequately use multiple switches to provide media programs to a single viewer and clearly identify billing data because the prior systems could not adequately track and collate billing information from multiple switches. Prior systems typically service a media request from a single media server in these instances.

The RTSMS 106 receives from the MMS 112 and any other switches streaming information blocks (SIBs) comprising signaling, event and billing information associated with each streaming session. The RTSMS 106 combines the information in the SIB with fixed attributes, such as a viewer identification associated with a reservation identification, a viewer profile, a viewer location, a media category being viewed, and other data to create the MSDR. The RTSMS 106 uses the reservation identification in the SIBs as the key to determining all SIBs for a presentation or a streaming event. The RTSMS 106 uses the reservation identification to collate all SIBs for that presentation or streaming event into the MSDR. The MSDR therefore represents the data used for billing records and reports for a presentation or other streaming event. The MSDR creates an auditable event record that is used for operational measurements and billing. The RTSMS 106 can use the MSDR with rules identified in an order to determine bills and credits to be appropriated to various entities.

The RTSMS 106 receives from the NRP 110 and the other routing processors pertinent NRP log records comprising reservation routing requests and their granting, refusal, transfers, and forwarding, including identification of switches streaming media and the associated session data. The RTSMS 106 stores the NRP log records and retrieves the NRP log records, such as if needed for auditing purposes.

The RTSMS 106 may be configured with a human machine interface (HMI) that enables a network operator to access the RTSMS or another communication device in the streaming system 102. The network operator can use the HMI to load new software to, for example, the MMS 112, to upgrade configurations, or to provide other maintenance, such as to execute functions specifying capacity to be used, to identify when switch components will be taken out of service for maintenance, to create new products or services for use by a media owner, and/or to issue test presentations to specific media servers on an MMS.

An RTSMS 106 may be a local or regional RTSMS. The RTSMS 106 of FIG. 1 is depicted as a local RTSMS. One or more RTSMS devices may exist in the streaming system 102. One RTSMS 106 is depicted in FIG. 1 for clarity.

The NRP 110 receives a request from a viewer 118 and 120 and processes the request. The request contains the identification of the NRP to which it is sent, and the reservation identification generated by the RTSMS 106. For example, the NRP 110 reservation may be an NRP host name or an NRP IP address, and the reservation identification may be a reservation number. The NRP 110 also receives the reservation from the RTSMS 106.

The NRP 110 processes the request and compiles a list of switches that may be able to provide the requested media to the requesting viewer 118 or 120. The NRP 110 identifies an ordered list of switches, and attempts to select a switch based on network distribution rules. For example, the network supplier can choose to route on the best possible quality of service that can be provided to the viewer 118 or 120, to route on geographic factors, the time of day, the day of the week, the day of the year, or the access provider, or to route on overall network conditions.

The NRP 110 communicates with the switches to determine which switch, if any, can provide the requested media. For example, the NRP 110 may start with the best identified switch and, if not available, communicate with the next-best identified switch. The NRP 110 transmits to the viewer 118 or 120 an address, such as an IP address, of the switch that can provide the requested media. In one embodiment, if no switch can be found in the first pass, then a bumping algorithm can be invoked that may bump a current stream from a switch. The rules for bumping can be established by the network operator, for example, according to service agreements with publishers.

In one embodiment, a request is sent from the viewer 118 or 120 to the NRP 110 for each media clip on the play script. Thus, the NRP 110 must determine a switch that can stream the particular media clip of the play script to the viewer 118 or 120 separately for each media clip on the play script. Each time the NRP 110 determines the switch that can provide the media clip, the NRP transmits an IP address of the switch or a communication device, such as a stream caster on the switch, to the viewer 118 or 120.

For example, if a play script identifies two media clips, the viewer 118 or 120 transmits a media locator request to the NRP 110 for the first media clip. The NRP 110 determines a switch that can provide the first media clip and transmits an IP address of that switch to the viewer 118 or 120. After the viewer 118 or 120 receives the first media clip in a session with that switch, the viewer could send another media locator request to the NRP 110 for the second media clip. The NRP 110 determines a switch that can provide the second media clip and transmits an IP address of that switch to the viewer 118 or 120. The viewer 118 or 120 then receives the second media clip in a session with that switch.

The switch that streams the first media clip may be the same as or different from the switch that streams the second media clip. Also, multiple devices on one switch, such as two different stream casters on a switch, each may stream one of the media clips, or one device on the switch may stream both media clips.

In another embodiment, the NRP 110 can be configured to determine a switch that can provide all media clips on a play script. In this embodiment, a single determination is completed by the NRP 110 in which the NRP locates a single switch that can stream all media clips on the play script to the viewer 118 or 120.

The NRP 110 receives and processes signaling from each MMS and each other switch before, during, and after media is streamed. If a switch or part of a switch fails or can no longer maintain stream quality during a media streaming, the switch may notify the NRP 110, and the NRP may determine a different, second switch that can provide the requested media. The NRP 110 then may direct the failing switch to route the streaming session to the second switch.

The NRP 110 initiates a state model for each viewer and each streamed media. The state model comprises a view of an entire media streaming event to a viewer 118 or 120, including which switch or switches streamed media to the viewer, the time each media request is sent to each switch, any alarm or error events for a switch, such as alarms or events that may require another switch to provide the requested media, and transfers or re-connections to another switch to provide the requested media. The state model may include an identification of devices within the switch that provide the requested media to the viewer 118 or 120, such as which stream caster or stream casters within an MMS 112 stream media to the viewer.

The state model in the NRP 110 includes a switch identification and the major states of a session or a connection, sometimes referred to as persistent states. Major states may include the reservation acceptance, an initiation of a session or connection, a termination of a session or connection, and other persistent states. The state changes may be received when setup or teardown messages are received by the MMS 112 and at other states. Each state change preferably is identified with the reservation identification.

The NRP 110 transmits an NRP log to the RTSMS 106 when the media for a presentation has been streamed to a viewer 118 or 120, if an error occurs during a streaming session, and periodically during a streaming session. The period during the streaming session is configurable. In one embodiment, the period is every five minutes. Another period or default mechanism may be used, such as the occurrence of an event.

The NRP 110 may use the domain name server (DNS) protocol to receive a media locator request from the viewer 118 and 120 and to return an IP address of the stream caster in the MMS to which the viewer will connect for a session. Other protocols, such as session initiation protocol (SIP) or H.323, may be used.

One or more NRP devices may exist in the streaming system 102. One NRP is depicted in FIG. 1 for clarity.

The MMS 112 streams media to a viewer 118 or 120. The MMS 112 has communication devices, such as one or more stream casters and one or more media servers, that provide requested media to a viewer 118 or 120. The MMS 112 monitors the communication devices, such as one or more stream casters and one or more media servers, within the MMS so that the MMS can determine if it can provide a requested media.

The MMS 112 processes signaling from the NRP 110 and returns signaling to the NRP 110. The MMS 112 receives signaling messages inquiring if the MMS can stream media to a viewer 118 or 120. The MMS 112 processes that inquiry, determines if it has the resources, such as a stream caster type, network bandwidth, disk space, and a media server, to stream the media, and responds with a message to the NRP 110 accepting or denying the inquiry.

The MMS 112 receives reservation data from the NRP 110 for a media clip in a presentation. The MMS 112 may be configured to receive reservation data from the NRP 110 and a reservation identification from the viewer 118 or 120. In that instance, the MMS 112 may authenticate the reservation identification using the reservation data from the NRP 110 to determine if the reservation identification is valid. In one embodiment, if the MMS 112 receives the reservation identification for the presentation from the viewer 118 or 120 within a configurable period of time, and the reservation identification is valid when compared to the reservation data from the NRP 110, the MMS 112 will stream the media to the viewer. In another embodiment, if the viewer 118 or 120 does not transmit the valid reservation identification to the MMS 112 for that presentation, fails authentication, or if the viewer transmits the correct reservation identification but not within the configurable period of time, the MMS will not stream the media to the viewer. In that instance, the MMS 112 will reject the request from the viewer 118 or 120, and a session will not be initiated. The rejection is transmitted to the RTSMS 106.

The MMS 112 may have a stream routing processor (SRP) or another type of processor or monitor that processes requests for media using the current state of the switch, such as available bandwidth, bandwidth necessary to provide a requested media, hardware and software version compatibility, disk space capacity, the current operating mode of the MMS, and/or other state factors. The MMS 112 monitors the delivery of each media stream and the status of switch systems. The MMS 112 may detect an imminent failure of one or more communication devices in the MMS if such a failure occurs, such as a failure of a stream caster's media server. The MMS 112 can transmit this data to the NRP 110.

If a stream caster, a media server on the stream caster, or another communication device in the MMS 112 fails, the MMS can transparently transfer all streams in-progress to another stream caster or to another media server on the stream caster, if one is available. The transfer and the continued streaming of the media are not recognizable by the viewer 118 and 120.

If a communication device on the MMS 112 fails and another is not available on that MMS, the MMS notifies the NRP 110 and the RTSMS 106. In response, the MMS 112 will receive and process from the NRP 110 a message instructing the MMS to route the stream to another MMS. The MMS 112 then will route the stream to the identified MMS. The transfer and the continued streaming of the media are transparent to the viewer 118 and 120.

The MMS 112 has a state model in which the MMS stores information and state changes for a viewing session of a presentation. The MMS 112 stores and reports each state change at the appropriate level. For example, the state model stores information and state changes for the initiation of a session, the termination of a session, and viewing events. Viewing events are events triggered by a viewer that affect the media streaming of the presentation. Viewing events may be, for example, a play, a pause, a stop, a forward, a cancel, a complete, or a rewind.

If the MMS 112 transfers a stream to a different stream caster or media server within the MMS, that event is noted in the state model, and the state model stores the information and state changes for the new stream caster or media server. If the MMS 112 transfers a stream to a different MMS, that event is noted in the state model.

The MMS 112 transmits to the RTSMS 106 stream information blocks (SIBs) for each stream session event and for each viewing session event. The SIB comprises information associated with the streaming session from the MMS 112 to the viewer 118 or 120, including the reservation identification, an identification of the MMS or other switch, the stream caster and media server used, the media streamed, the presentation identification, the packet data path for each session, the equipment used for the streaming, and/or viewing events, such as a pause or rewind. One or more of the previous items may be used or not used in the SIB. If more than one stream caster or media server on one or more stream casters is used, that information also may be specified in an SIB.

An SIB is created when a viewing session is initiated, when a viewing session is terminated, when new media is presented, during a streaming session at configurable periods, and/or when other viewing events occur, such as a pause, stop, rewind, forward, or error. The SIBs are subsequently transmitted. In one embodiment, the period is configured at five minutes. Other periods, different periods, or defaults, such as an event, can be used.

One or more MMS devices may exist in the streaming system 102. One MMS 112 is depicted in FIG. 1 for clarity.

The packet networks 114 and 122 each are a communication network capable of transmitting data, such as signaling or media streaming, to or from a communication device in the streaming system 102, such as to or from the ESRP 104, the RTSMS 106, the NRP 110, the MMS 112, the portal 116, and/or the viewers 118 and/or 120. The packet networks 114 and 122 may be the Internet, an intranet, a virtual private network, a cable system, a frame relay network, an ATM network, a satellite network, and/or other packet based networking solutions. In one embodiment, the packet network 114 is a private network accessible by the ESRP 104, the RTSMS 106, the NRP 110, the MMS 112, and an authorized portal 116. In another embodiment, the packet network 122 is a public network.

The portal 116 is a processor, such as a server, configured to communicate with a viewer 118 or 120. The portal 116 manages communications between the viewer 118 or 120 and the RTSMS 106. For example, the portal 116 may transmit viewer media selections to the RTSMS 106 and may transmit reservation data originating from the RTSMS to the viewer 118 or 120. The portal 116 may be a web-based processor, a set top processor, or another type of processor.

The viewer 118 or 120 may use the hypertext mark-up language (HTML) IP protocol via IP sessions using a web browser that can be serviced by a web-based server. The viewer 118 or 120 also may use broadband protocols via a broadband connection using a set top box appliance communicating with a set top server. A set top server can process various protocols, including session initiation protocol (SIP), which is an International Telecommunications Union (ITU) H.323 series protocol. The portal 116 of FIG. 1 is authorized to transmit messages to the RTSMS 106.

The viewers 118 and 120 are any communication device capable of transmitting and/or receiving signaling and/or media. The viewers 118 and 120 may be broadband based viewers or narrowband based viewers. For example, the viewers 118 and 120 may have a browser configured to communicate using a web based protocol such as hypertext transfer protocol (HTTP). Also, the viewers 118 and 120 may have a media player configured to play media that is streamed to the viewers. In addition, the viewers 118 and 120 may have a set top box or another digital appliance configured to play media streamed from a cable television provider, a digital satellite provider, or another type of provider.

In some embodiments, the NRP 110 requests the MMS 112 to provide a media clip. In this embodiment, if the MMS 112 can provide the requested media clip, the MMS responds to the NRP 110 that it can provide the requested media clip. The NRP 110 transmits a message to the viewer 118 or 120 identifying the MMS 112 as providing the media clip. The viewer 118 or 120 initiates a session or a connection to the MMS 112, and the MMS provides the requested media clip.

In other embodiments, the NRP 110 requests the MMS 112 to provide multiple media clips. In this embodiment, if the MMS 112 can provide the requested media clips, the MMS responds to the NRP 110 that it can provide the requested media clips. The NRP 110 transmits a message to the viewer 118 or 120 identifying the MMS 112 as providing the media clips. The viewer 118 or 120 initiates a session or a connection to the MMS 112, and the MMS provides all of the requested media clips without further action from the NRP 110. In this embodiment, in one instance, the viewer 118 or 120 initiates a single session or connection with a single setup message, and the MMS 112 streams all requested media clips before the session or connection is terminated. In another instance, the viewer 118 or 120 transmits a separate setup message and teardown message for each media clip, and the MMS 112 stops streaming media after the last requested media clip is streamed.

In other embodiments, the NRP 110 requests the MMS 112 to provide multiple media clips. In this embodiment, if the MMS 112 can provide the requested media clips, the MMS responds to the NRP 110 that it can provide the requested media clips. The NRP 110 transmits a message to the viewer 118 or 120 identifying the MMS 112 as providing the media clips. The viewer 118 or 120 initiates a session or a connection to the MMS 112, and the MMS provides all of the requested media clips. However, after each media clip is streamed, the viewer 118 or 120 communicates with the NRP 110 to receive authorization to initiate a session with the MMS 112. The NRP 110 communicates with the MMS 112 to confirm that the MMS 112 can provide the next media clip. The MMS 112 acknowledges to the NRP 110 that it can provide the next media clip, and the NRP acknowledges to the viewer 118 or 120 that the MMS 112 can provide the next media clip. The viewer 118 or 120 then transmits another setup message to the MMS 112 to obtain the next media clip.

In some embodiments, the NRP 110 requests the MMS 112 to provide a presentation. In this embodiment, if the MMS 112 can provide the requested presentation, the MMS responds to the NRP 110 that it can provide the requested presentation. The NRP 110 transmits a message to the viewer 118 or 120 identifying the MMS 112 as providing the presentation. The viewer 118 or 120 initiates a session or a connection to the MMS 112, and the MMS provides the requested presentation.

In some instances in this embodiment, the viewer 118 or 120 transmits a setup message for each media identified in the presentation play script, receives the media, and tears down the session or connection for that media. The viewer 118 or 120 then immediately transmits another setup message to the MMS 112 to get the next media on the play script. The viewer 118 or 120 receives the media and tears down the session or connection. This process continues until the viewer 118 or 120 has received all media on the play script. In other instances in this embodiment, the viewer 118 or 120 transmits a setup message to the MMS 112, receives the media, transmits a teardown message to the MMS, and communicates with the NRP 110 prior to transmitting another setup message to the MMS to confirm that the MMS will provide the next media clip on the play script.

The examples for the Figures below may reference one or more of a publication by an owner, a distribution by the ESRP 104, a request and/or selection by a viewer 118 or 120 processing a reservation request by the RTSMS 106, a reservation made by the reservation system 108, communication between the RTSMS and the NRP 110, a request from the NRP to an MMS, an acknowledgement or denial of service by an MMS, a communication from the NRP to the viewer denying or accepting a presentation streaming, and/or a subsequent session or connection from the viewer to the MMS. In the examples, reference to one or more of these actions may identify the embodiment as distributing, requesting, or providing media in accordance with a presentation embodiment or a media clip embodiment described above. However, this discussion uses a presentation embodiment and a media clip embodiment for clarity and conciseness. It should be appreciated that any of the above stated embodiments, or any combinations thereof, may be used.

The streaming system 102 of FIG. 1 operates as follows. In a first example, a media owner generates a program with an order that is placed on the ESRP 104. The program has multiple media items, including a media clip for a movie and an advertisement. The program includes a time restriction that it is not to be played between the hours of 7:00 p.m. and 9:00 p.m. Pacific Time. The program further includes a geographic restriction requiring the program to be placed on a switch in the western region of the United States, including California.

The order for the program includes billing information, such as the media owner is to be credited with 80% of the revenue generated from the program, and the network owner is to be credited with the remaining 20%. The media owner publishes the program with the respective order to the ESRP 104.

The ESRP 104 processes the program with its respective media rules and order. The ESRP 104 distributes the program to multiple switches in the western United States, including California. The ESRP 104 also transmits to the RTSMS 106 the publication data, including an identification of the media clips in the program, the media rules, and the order.

A viewer 118 selects an option to obtain one or more programs which, for example, contain movie media clips. In this example, the option is a link on the portal 116. When the link is selected, the portal 116 calls the reservation system 108 on the RTSMS 106.

The reservation system 108 is notified that the viewer 118 requested access to the program. The reservation system 108 determines that the program is active within the network. The order may request additional viewer billing information, such as a credit card for a pay-per-view event or a subscription password to be supplied for billing authorization. The reservation system 108 determines if the program contains media rules that require a statistical identification of the viewer. If required by the media rules, the reservation system 108 collects the statistical information.

The reservation system 108 creates a customized presentation for the viewer based on the program, including the play script of the media clips and the media rules, if any. The reservation system 108 builds a reservation having the identification of the viewer 118 and the identification of an NRP 110 selected to identify a switch to provide the presentation. In this example, the NRP identification is the host name of the NRP 110. The reservation also includes the presentation identification, including the customized play script of the presentation. The customized play script includes media selected based upon the statistical identification data, time of day, day of week, personal viewing preferences, or any other attributes that the publisher deems pertinent. In this example, the presentation includes a movie media clip and an advertisement.

The reservation system 108 transmits the reservation to the NRP 110. In addition, the reservation system 108 transmits to the viewer 118 the play script with each entry on the play script having the host name of the NRP, the reservation identification, and the presentation identification.

The viewer 118 transmits a media locator request to the NRP 110. The media locator request in this example comprises at least one name on the play script, the NRP host name, and the reservation identification.

The NRP 110 uses the received reservation identification to obtain the presentation identification and additional data about the reservation. The NRP 110 processes the media locator request and the reservation data to determine if an MMS within the streaming system 102 can service the request. The NRP 110 compiles a list of MMSs that have the program and that can provide the presentation according to the media rules. In this example, the NRP 110 determines, based on load balancing factors and network distribution rules, that the MMS 112 is the best selection to provide the presentation.

The NRP 110 communicates with the MMS 112 to determine if the MMS can provide the presentation. The MMS 112 responds that it can provide the presentation to the viewer 118. In this example, the MMS 112 has a stream caster that can stream the presentation to the viewer 118.

The NRP 110 transmits to the viewer 118 an IP address of a stream caster on the MMS 112. In addition, the NRP 110 transmits the reservation data to the MMS 112. Also, the NRP 110 saves information in a state model identifying the reservation identification, the presentation identification, that the MMS 112 will stream the presentation to the viewer 118, and the time the MMS accepted the streaming request.

The viewer 118 receives the IP address and initiates a session with the MMS 112. The MMS 112 streams the presentation to the viewer 118, including the movie media clip and the advertisement. The MMS 112 retains information in a state model identifying the reservation identification, the presentation identification, the start and stop times of each media on the play script, and any viewing events, such as a pause, a forward, a reverse, or other events.

When each media on the play script has been streamed to the viewer 118, the viewer initiates an end to the session. The MMS 112 stores information in its state model identifying the end of the session. The MMS 112 transmits its logs, SIB information, and state model information to the RTSMS 106.

The MMS 112 notifies the NRP 110 that the presentation streaming is complete. The NRP 110 stores information in its state model identifying that the presentation streaming is complete and transmits the state model data to the RTSMS 106.

The RTSMS 106 processes the logs, the SIB information, and any additional data that originated from state models from both the NRP 110 and the MMS 112. The RTSMS 106 collates the data using the reservation identification to produce the MSDR data identifying billable events, including the presentation that was streamed to the viewer 118, the amount of media streamed to the viewer, and the streaming time.

The RTSMS 106 applies the order rules to the MSDRs. In this example, the RTSMS 106 produces a financial settlement and report identifying a credit of 80% of the revenue generated by the presentation to the media owner and a credit of 20% of the revenue generated by the presentation to the network owner.

In another example, the viewer 120 requests media and receives a play script from the RTSMS 106 for viewing a presentation. The presentation has three media clips. In addition, the NRP 110 receives the corresponding reservation from the RTSMS 106. In this example, the MMS 112 has two stream casters.

The viewer 120 transmits a request containing the reservation identification to the NRP 110. The NRP 110 processes the request with the reservation received from the RTSMS 106 to compile a list of switches that can provide the requested presentation. The NRP 110 communicates with the MMS 112 to determine if the MMS can provide the presentation to the viewer 120. The MMS 112 responds to the NRP 110 that it has a stream caster that can stream the presentation to the viewer 120. The NRP 110 transmits an IP address of the first stream caster on the MMS 112 to the viewer 120.

The viewer 120 initiates a session with the first stream caster on the MMS at the IP address provided by the NRP 110. In addition, the MMS 112 notifies the NRP 110 that the streaming session has been initiated. The MMS 112 stores all information regarding the streaming and the state model.

The NRP 110 stores information in a state model identifying the MMS 112 as providing the presentation. This information is transmitted in an NRP event log to the RTSMS 106 as it occurs or at a specified configurable time. In this example, the NRP 110 transmits the NRP log to the RTSMS 106 every five minutes. In other examples, the NRP 110 can be configured to transmit the NRP log to the RTSMS 106 when a session is initiated between a viewer and a particular switch and when that session is terminated. In addition, in other examples the NRP 110 can be configured to transmit the NRP log at other configurable times or at different configurable events.

When the session is initiated between the viewer 120 and the MMS 112, the MMS creates an SIB and subsequently transmits the SIB to the RTSMS 106. In addition, while the media is streamed from the MMS 112 to the viewer 120, an SIB is created and transmitted to the RTSMS 106 at a configurable time. In this example, the configurable time is every five minutes. In other examples, the time may be configured to different periods of duration. In addition, in this example, the MMS 112 transmits an SIB to the RTSMS 106 when viewing events occur, such as a stop, a pause, a forward, or a rewind. Also, when the presentation streaming is complete and the session is terminated, the MMS 112 transmits an SIB to the RTSMS 106.

When the session is complete and terminated, the MMS 112 notifies the NRP 110. The NRP 110 transmits a final NRP log to the RTSMS 106.

In this example, the RTSMS 106 collates all of the SIBs into an MSDR using the reservation identification in each SIB. The MSDR then can be used to provide billing records to billing entities according to billing rules, such as those that may be in an order associated with the program. In other examples, the RTSMS 106 may use the NRP logs in conjunction with the SIBs to create the MSDR.

In another example, the viewer 118 receives a play script with a reservation identification from the RTSMS 106. In addition, the NRP 110 receives the reservation from the RTSMS 106. The viewer 118 transmits a media locator request to the NRP 110, and the NRP 110 processes the media locator request with the reservation data received from the RTSMS 106. The NRP 110 compiles a list of switches, including the MMS 112, that can provide the presentation identified in the reservation. The NRP 110 communicates in turn with the MMS 112 to determine if the MMS can provide the presentation. The MMS 112 replies to the NRP 110 specifying that it can provide the presentation. The NRP 110 transmits an IP address of a stream caster on the MMS 112 to the viewer 118.

The viewer 118 initiates a session with the MMS 112. The MMS 112 streams the presentation to the viewer 118 as requested.

While the MMS 112 is streaming the presentation to the viewer 118, an error occurs, and the MMS is not able to continue streaming the presentation to the viewer. The MMS 112 notifies the NRP 110 that it cannot continue streaming the presentation to the viewer 118.

The NRP 110 determines that the session for the presentation must be re-routed and communicates with a second MMS identified on the list of switches capable of providing the presentation (not shown). The second MMS notifies the NRP 110 that it can provide the presentation. The NRP 110 notifies the first MMS 112 to route the session to the second MMS.

The session is routed to the second MMS. The second MMS provides the rest of the presentation to the viewer 118. When the presentation has completed, the session is terminated by the viewer 118. The second MMS notifies the NRP 110 that the streaming for the presentation is complete and the session is terminated.

In this example, the MMS 112 transmits SIBs to the RTSMS 106 when the session is initiated, during the configurable periods of time while the presentation is streaming, during any viewing events, when the stream caster fails, and when the session is routed to the second MMS. Likewise, the second MMS transmits SIBs to the RTSMS 106 when the session is routed to the second MMS and the second MMS starts streaming the media for the presentation, during the configurable periods of time while the presentation is streaming, when any viewing events occur, and when the session is terminated. Each of the SIBs contains the reservation identification for the presentation. In addition, the NRP 110 transmits NRP logs to the RTSMS 106 identifying both the MMS 112 and the second MMS when the respective MMSs provide the media streaming for the presentation.

The RTSMS 106 receives the SIBs from the MMS 112 and the second MMS. The RTSMS 106 collates the SIBs to create an MSDR using the reservation identification contained in each SIB. The MSDR then can be used for settlement purposes.

In another example, the viewer 120 requests access to media. The RTSMS 106 returns a play script to the viewer 120. The play script identifies two media clips, in addition to the reservation identification and the NRP identification. In this example, the media clips are identified by URLs, and the reservation identification is a reservation number attached to the URL. Also, the NRP identification in this example is a host name for the NRP 110. The RTSMS 106 also transmits the reservation to the NRP 110.

The viewer 120 transmits a request to the NRP 110. In this example, the request is a media locator request. The media locator request identifies the play script and the reservation identification. The NRP 110 processes the media locator request and the reservation received from the RTSMS 106. The NRP 110 compiles a list of all possible switches that can handle the presentation identified by the play script.

The NRP 110 communicates with the MMS 112 to determine if the MMS can provide the presentation. The MMS 112 transmits a message back to the NRP 110 identifying that it can provide the presentation. The NRP 110 transmits an IP address of a stream caster on the MMS 112 to the viewer 120.

The viewer 120 initiates a session with the MMS 112. The MMS 112 streams the media for the first media clip identified on the play script to the viewer 120.

In this example, when the viewer 120 has received all of the media for the first media clip, the viewer terminates the streaming session by initiating a tear down message. This may occur, for example, when the next media clip on the play script requires a different media server type.

The viewer 120 determines that there is a second media clip of a different media server type on the play script for the presentation. The viewer 120 contacts the NRP 110 to determine if a switch is able to provide the second media clip for the presentation.

The NRP 110 communicates with the MMS 112 to determine if the MMS can provide the second media clip on the play script for the presentation. The MMS 112 communicates back to the NRP 110 with a message stating that the MMS 112 cannot provide the second media clip on the play script for the presentation because the MMS does not have the required media server.

The NRP 110 receives the message from the first MMS 112. The NRP 110 communicates with a second MMS (not shown) to determine if the second MMS can provide the second media clip on the play script for the presentation. The second MMS communicates a message to the NRP 110 that it can provide the second media clip on the play script for the presentation. The NRP 110 transmits a message to the viewer 120 identifying an IP address of a stream caster on the second MMS.

The viewer 120 initiates a session with the second MMS at the identified IP address. The second MMS streams the second media clip in the play script for the presentation to the viewer 120. When the streaming for the second media clip is complete, the viewer 120 terminates the session. The second MMS notifies the NRP 110 that the streaming for the second media clip is complete, and that the session is terminated.

The first MMS 112 and the second MMS transmit SIBs to the RTSMS 106 at the initiation of each session, at the termination of each session, upon viewing events, and at configurable periods of time. In addition, the NRP 110 transmits NRP logs to the RTSMS 106. The SIBs and the NRP logs identify the reservation identification for the presentation.

The RTSMS 106 collates the SIBs from each of the first MMS 112 and the second MMS to create an MSDR. The MSDR can be used for billing records and other settlement purposes.

Figure 2:
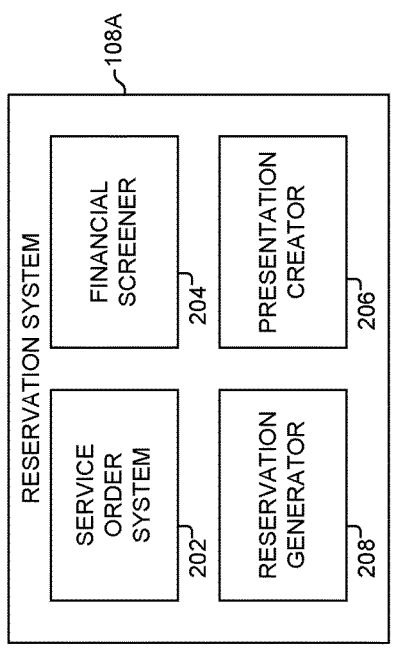
FIG. 2 is a block diagram of a reservation system in accordance with an embodiment of the present invention.

FIG. 2 depicts an exemplary embodiment of a reservation system for a streaming system. The reservation system 122A comprises a service order system 202, a financial screener 204, a presentation creator 206, and a reservation generator 208. Systems and processes may be combined or separated.

The service order system 202 identifies the viewer from which a request is received. The service order system 202 authenticates the viewer 118 or 120 to determine whether the viewer is authorized to make a request for the desired program. In one embodiment, the service order system 202 compares the viewer profile against service rules provided by the media owner in the order. The service order system 202 may verify that the order for the program is in effect and that the program is available at a viewing time requested by the viewer 118 or 120. In another embodiment, the service order system 202 may authorize any viewer 118 or 120 and/or any request for a program. In this instance, a service rule requiring validation may not be present or may provide that any viewer may receive the program. Other examples exist.

The service order system 202 may be configured to validate that a request is received from a valid communication system, such as a valid portal 116 of FIG. 1. In some embodiments, the validation of the communication system may not be required.

It will be appreciated that in other embodiments, authentication of the viewer 118 or 120 and/or validation of the communication system providing the request may involve external systems. For example, a media owner may make an arrangement with a portal site to allow viewing of all of the media owner's content on a fee for service basis where the portal 116 owner pays the bill. No viewer identification or payment collection is involved. When the request for service comes to the network owner, the service order system 202 can be defined to access the network owner's accounts receivable system to determine if the portal 116 is more than 90 days late in payment. If the portal 116 owner has not made a bill payment in the last 90 days, the service request can be rejected.

The financial screener 204 validates financial transactions with a viewer 118 or 120, such as by determining whether a viewer can pay for a program or whether a viewer has paid for a program, if payment is required from the viewer for a requested program. For example, a financial transaction may be required for a pay-per-view program, a subscription, a gift certificate, discounted events, promotions, and/or combinations of the above or other events.

In some embodiments, external systems may be used during a financial screening process. For example, a viewer 118 or 120 requesting a pay-per view, non-subscription service may require an immediate credit card payment. In order for the viewer 118 or 120 to access the content, the viewer must provide valid credit card data that is passed to an external credit card processing system for payment authorization. If the credit card processing system returns a credit accepted status, the viewer's transaction continues to be processed. If the external credit card application rejects the credit card, a message is forwarded to the viewer 118 or 120, and the viewer's transaction continues pending until a valid payment is made or the viewer cancels the request.

The presentation creator 206 creates a tailored presentation for a viewer 118 or 120 based upon the requested program and its associated service rules and settlement rules, if any. In some instances, the presentation creator 206 may process the viewer profile, if the viewer profile is available, with the viewer's request and the program rules to generate the presentation. Thus, a presentation is customized for an individual viewing session by the presentation creator 206. Additionally, in other embodiments, the presentation creator 206 may reject a request instead of creating a presentation for the viewer 118 or 120.

The presentation creator 206 may be configured to generate different presentations based upon different viewer profiles. For example, different advertisements may be selected for a presentation based upon a viewer profile. Alternately, a movie may have a different ending that may be selected for a different market, a different language, closed captioning, letter box format, or another selection.

The different selections for a media clip are based on a selection criteria provided by a media owner in the program, may specify directly which media clip to provide in the presentation, may provide a media alias that is resolved at a later time, including after a viewing session has started, or provide another presentation criteria. Additionally, any portion of the presentation selection may be based on attributes and respective values identified for a viewer profile for a specified program. The attributes may be demographics, such as age, gender, marital status, income, or other demographics, geographic location, such as a city, a state, a country, a college, a region, or other geographic location attributes, hobbies, such as basketball, tennis, rowing, crafts, or other hobbies for showing a product placement, preferences, such as drama, comedy, religious preferences, or other preferences, job grades, such as enterprising, management, union, non-union, local law enforcement, or other job grades, and/or other attributes for which a media owner identifies for a viewer profile.

The reservation generator 208 determines whether the streaming system has the necessary resources to stream a presentation for a requested program to a viewer. The reservation generator 208 processes the presentation generated by the presentation creator and the request to identify whether a resource in the streaming system, such as a switch, can provide the presentation for a requested program and the generated reservation. If the necessary resource or resources are not available to stream the presentation, the reservation generator 208 may reject the request, put the request on a waiting list, or pass the request to another system that may be able to provide the requested program, such as to another RTSMS or an external system. If the reservation generator 208 determines that the resources are available, the reservation generator may accept the request and create the reservation for the presentation, including assigning a reservation identification to the reservation. The reservation generator 208 tracks the reservation identification for each reservation.

The reservation generator 208 selects an NRP, such as the NRP 110, to handle routing requests for the reservation and transmits the reservation to the selected NRP. The reservation may be transmitted to the selected NRP at any time before the start time of the presentation, including immediately after the reservation is assigned to the viewer and the presentation, immediately prior to the assigned starting time for the presentation, or anytime in between. The reservation generator 208 creates a play script for the viewer and transmits the play script to the viewer. The reservation generator 208 creates a customized play script for each customized presentation, including a play script for the media clips in the presentation and the reservation identification. In one embodiment, the play script contains one or more URLs, with each URL containing a media reference and the reservation identification. It will be appreciated that the reservation may be for a single reservation for a viewer or part of a block of reservations. The single reservation and/or the block of reservations may be prior-established reservations or future reservations.

Figure 3:
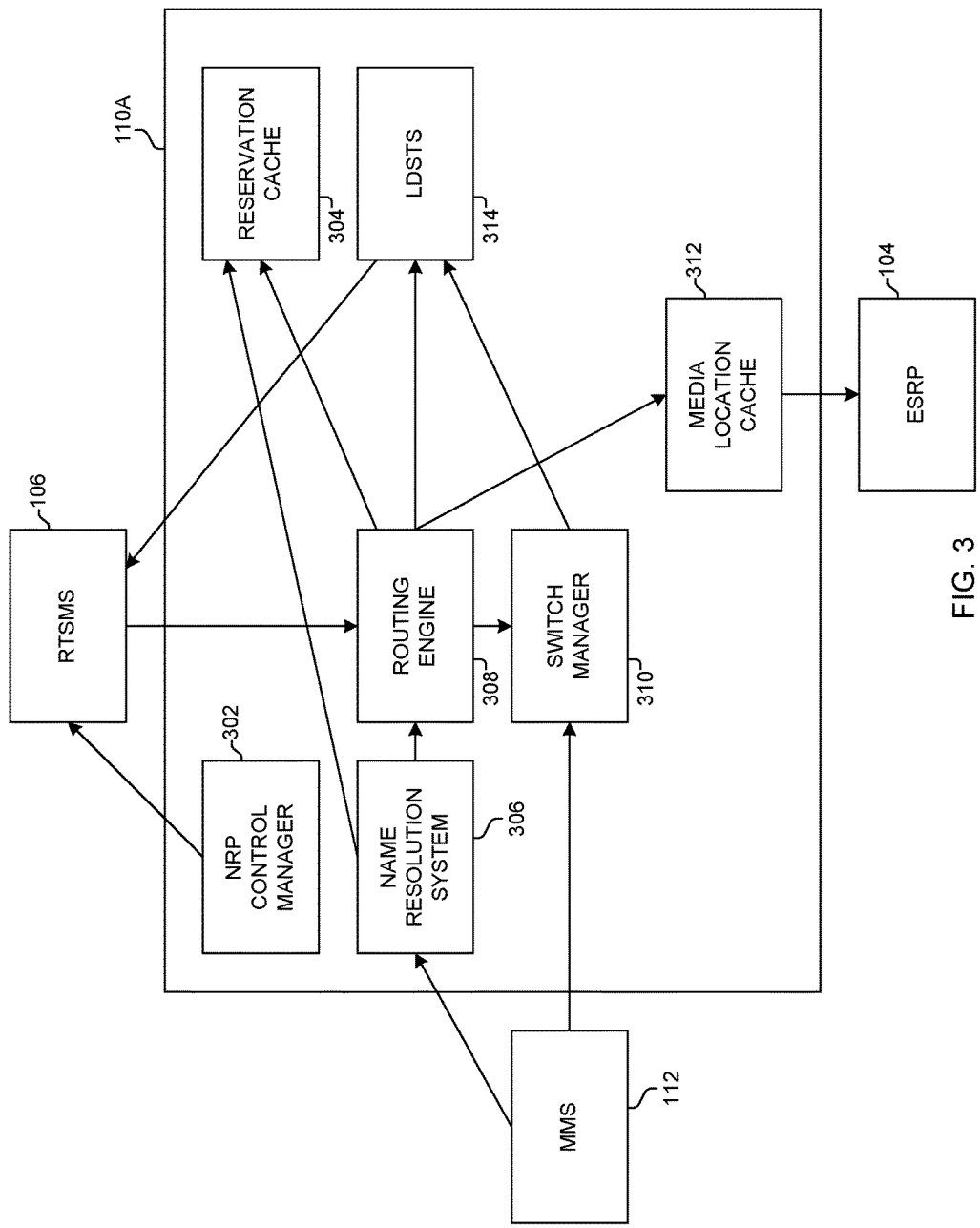
FIG. 3 is a block diagram of a name routing processor in accordance with an embodiment of the present invention.

FIG. 3 depicts an exemplary embodiment of an NRP of the present invention. The NRP 110A of FIG. 3 comprises an NRP control manager 302, a reservation cache 304, a name resolution system 306, a routing engine 308, a switch manager 310, a media location cache 312, and an NRP LDSTS 314.

The NRP control manager 302 monitors and stores the events and the status of each subsystem and device within the NRP 110A. The control manager 302 also monitors messages transferred between subsystems on the NRP 110A and processing of those messages by subsystems in the NRP. The control manager 302 generates an alarm upon detection of an error event. The control manager 302 also monitors and stores configuration changes made from a network operator or another source. The control manager 302 manages the NRP 110A at an aggregate level.

The control manager 302 maintains in memory the total bandwidth used by the NRP 110A, the total number of active requests, the current not to exceed bandwidth capacity, the current not to exceed active requests capacity, the current processing capacity, and the current not to exceed processing capacity. The memory enables the control manager 302 to reject name resolution requests, such as a DNS lookup request or a broadband SIP connection request, when the name resolution request will place the NRP 110A above the desired thresholds.

The reservation cache 304 maintains reservations identifying current and imminent reservations in the streaming system 102. The reservation is used to feed the routing engine 308 and to validate whether a reservation exists.

The name resolution system 306 is the entry point to the routing engine 308. The name resolution system 306 receives the NRP identification signaling in a translatable protocol and provides the mapping back for a reply. In one embodiment, the name resolution system 306 receives an NRP host name in a DNS protocol format as the NRP identification and, after the routing engine 308 has processed the request and an MMS that can provide the media is located, maps the response as an IP address to the MMS, a stream caster, or other device on the MMS. The name resolution system 306 also resolves NRP identification requests from broadband communication devices.

The name resolution system 306 manages communications with other NRPs and/or other signaling systems controlled by other networks. The latter usually requires conversion between various protocols.

The name resolution system 306 operates as a signal gateway and is configured to process in-band signaling or out-of-band signaling. In-band signaling is signaling that is contained within a transmission path of a streaming service. For example, the SIP protocol can be in-band signaling. Additionally, the real-time transport protocol (RTP) is configured to contain RTP control protocol (RTCP) data embedded within the RTP transmission.

Out-of-band signaling is signaling that is transported via a transmission path separate from the media streaming path. The separate transmission path may be via different physical links, via a different internet protocol (IP) port number on a same physical path, via a virtual private network (VPN), or another method transmitting data via a separate logical or physical path.

The routing engine 308 determines whether to accept or to deny a request for media. If the routing engine 308 determines that an MMS can and should provide the requested media, the routing engine will accept the request. The routing engine 308 can reroute a media request. This can occur, for example, if the stream caster or its media server on an MMS fails or otherwise cannot begin or continue streaming the requested media. Other examples exist.

The routing engine 308 collects additional information for a connection or a session based on how the connection or session is established over what is provided in the initial reservation. For example, if a viewer is connecting via a directly managed broadband network, the routing engine 308 collects detailed information on the actual logical virtual path/virtual circuit. The routing engine 308 can update reservation information or NRP logs with this additional information and have the updated information transferred to the RTSMS 106 for future use.

The switch manager 310 monitors and stores the state of the MMSs and their communication links. The switch manager 310 also transmits the reservation to the MMSs, receives requests from an MMS to reroute a media stream, and responds to reroute requests.

The media location cache 312 caches program information, such as the identification of the media in a program, on what MMS devices the media is located, the anticipated streaming time of the media, the playing time of streamed media, the average bandwidth needed to stream media of a program, the maximum bandwidth needed to stream media of a program, and the quality of the media encoding. This program information is used by the routing engine 308 to make routing decisions.

The NRP LDSTS 314 collects event data, such as state change data and reservation data, from other subsystems of the NRP 110A. The LDSTS 314 transmits the event data, including NRP logs, to the RTSMS 106 for billing, reporting, and network management.

Figure 4:
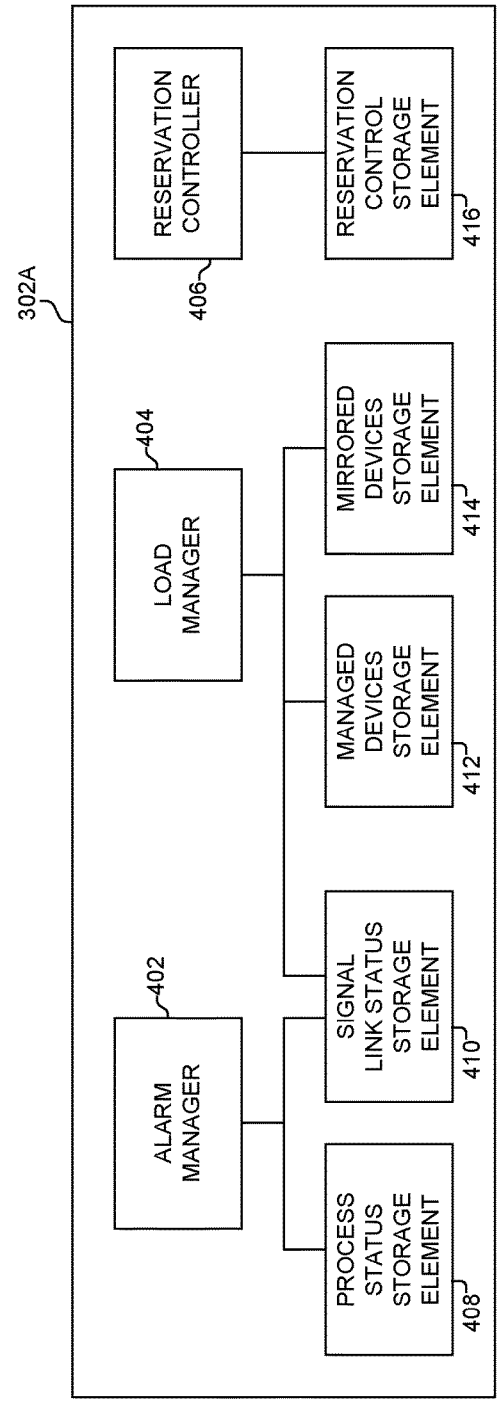
FIG. 4 is a block diagram of a control manager for a name routing processor in accordance with an embodiment of the present invention.

FIG. 4 depicts an exemplary embodiment of an NRP control manager of the present invention. The control manager 302A of FIG. 4 comprises an alarm manager 402, a load manager 404, and a reservation controller 406. The alarm manager 402 operates with a process status storage element 408 and a signaling link status storage element 410. The load manager 404 operates with the signal link status storage element 410, a managed devices storage element 412, and a mirrored devices storage element 414. The reservation controller 406 operates with a reservation control storage element 416. The storage elements 408-416 each may be, for example, a database, a table, an array, a programming object, a computer process monitoring event that can be called via an inter process or remote process communication, and/or another storage element. For simplicity, the storage elements 408-416 may be referred to as databases.

The alarm manager 402 operates to centrally control and monitor an NRP. The alarm manager 402 enables an operator to define one or more objects for the streaming system 102 that can be managed, for example, by simple network management protocol (SNMP) or common management information protocol (CMIP). For example, an operator may define a managed object for network management of the streaming system 102.

Additionally, the alarm manager 402 enables an operator to define alerts that may be unique to implementing the streaming system 102. For example, an alert may be defined by specifying the managed object and a threshold value for the managed object or an attribute of the managed object. If the value of the managed object or the attribute exceeds, either by meeting, going below, or going above the threshold of the managed object as specified by the threshold value, an alert may be triggered and generated to a console of the network operator and/or to an alarm log. For example, an invalid reservation identification count may be specified for the NRP and measured every five minutes. If the count reaches a specified number, such as ten, then an alarm may be generated.

Also, the alarm manager 402 monitors signaling processes operating on the NRP and generates an alert to a network operator and/or to an alarm log as to a possible and/or actual degradation of service. These signaling processes may be referred to as mission critical signaling processes. If a signaling process such as this halts, crashes, consumes an unreasonable amount of a resource, or otherwise causes an alert condition, signaling processing may be halted. This may occur, for example, where a name resolution system, such as the name resolution system 306 of FIG. 3, temporarily halts. In this instance, reservations that were assigned to that NRP can no longer be routed by that NRP, and a secondary NRP will have to process current and future reservations until the problem with the current NRP has been resolved. Reservations that already were routed may continue to be streamed.

The alarm manager 402 monitors the signaling processes and predicts potential and/or imminent failures. In some instances, the alarm manager 402 may auto correct a detected problem. For example, the alarm manager 402 may divert a reservation to another NRP and attempt to restart the name resolution system of the current NRP so as to restore the name resolution system to full operation.

In one embodiment, the alarm manager 402 is configured to generate forecasts. In this embodiment, the alarm manager 402 is configured to detect whether a selected MMS is approaching its capacity or is over capacity, even when the normal hardware SNMP device manager does not detect an over capacity event. The alarm manager 402 may be configured in this instant to determine the impact of scheduled reservations on the selected MMS and report if planned and current usage exceeds its capacity. Forecasting provides an advantage, for example, where forecasting of bandwidth use enables the streaming system to provide a high quality of service (QoS) for streaming high bandwidth, long duration media.

The alarm manager 402 monitors the data in the NRP process status storage element 408. The NRP process status storage element 408 contains the current and past status and records from the internal NRP processes. The alarm manager 402 may be configured to alert an operator and/or an alarm log if an internal NRP process is in an actual or potential alarm condition. In another embodiment, the alarm manager 402 may be configured to detect if a routing engine, such as the routing engine 308 of the NRP 110A (see FIG. 3), has halted. This may occur, for example, if routing software in the routing engine is not operating correctly. In this instance, the alarm manager 402 may be configured to alert a network operator and/or an alarm log to stop the routing engine and to restart the routing engine.

The alarm manager 402 also may be configured to monitor the signal link status storage element 410. The signal link status storage element 410 contains information identifying the current status and past records of the signal link transports for the signaling system 102. A signaling link may be one link on a communication path between devices in the signaling system 102, such as in an out-of-band signaling network. A signaling link may be, for example, a virtual path/virtual circuit connection, an IP connection, or another signaling link. The signaling link status may be dependant on the technology used. Signaling link status may include, for example, up/down, percent use, error rate, and other status attributes. The signaling link status may be accessed, for example, by SNMP or CMIP.

The alarm manager 402 monitors the signaling links and records the status of each signaling link in the signaling link status storage element 410. If a given signaling link is not operational, the alarm manager 402 may be configured to alert a network operator and/or an alarm log. The alarm manager 402 may be configured to attempt to re-establish a communication on the signaling link or establish communications to an alternate link to the same destination.

The alarm manager 402 also may be configured to enable a network operator to set attribute conditions, such as a signaling link load limit to ensure that signaling data is transported through the streaming system 102 on an efficient basis. The alarm manager 402 enables the operator to set the load limit level from zero to one hundred percent.

The load manager 404 controls the use of one or more MMS devices that are assigned to the primary control domain of that NRP. The primary control domain of a selected NRP are those MMSs or MMS devices that communicate with the selected NRP and that receive and follow instructions from the selected NRP, including instructions for streaming media to a viewer. The load manager 404 stores the status and statistics of each MMS and MMS device in that NRP's primary control domain in the managed devices storage element 412.

The load manager 404 also manages a secondary control domain set of MMSs and MMS devices. The secondary control domain includes one or more MMSs or MMS devices that are under the secondary control domain of another NRP. In the event the primary NRP for those devices fails, the load manager 404 of the current NRP will read the data located in the mirrored devices storage element 414 to identify and control the devices that were assigned to the failed NRP. The load manager 404 will read the data from the mirrored devices storage element 414 upon receiving an instruction to service the secondary control domain.

The load manager 404 monitors the state model of each reservation accepted by an MMS within its primary or secondary control domain. The load manager 404 updates the state model and the streaming use statistics and measures in the managed devices storage element 412. Examples of a streaming use statistic include the overall bandwidth use of an MMS, an individual streaming server bandwidth use within an MMS, an individual streaming server memory use, an individual streaming server disk use, an individual streaming server signaling link use, and other statistics.

The load manager 404 may be configured to compute the available capacity of an MMS or an individual streaming server by media server type. A streaming media server type may include Microsoft's Windows Media Server, Real Server, Apple's Quick Time/Darwin server, Oracle Video Server, and others. Available capacity may be classified over a time period in configurable time increments, such as five minutes. Classifying available capacity over a time period reflects scheduled reservations that have not yet connected.

The reservation controller 406 operates with a reservation control storage element 416. The reservation controller 406 handles communications between one or more NRPs within the signaling system 102 and communications to and/or from a signaling device of another packet network to fulfill a reservation request. The reservation controller 406 stores the reservation request and associated information where necessary in the reservation control storage element 416. Associated information may include the destination to which the reservation controller 406 routed the reservation request, the time the reservation request was routed, and other data required to process the reservation request.

The reservation controller 406 maintains timers on remotely routed reservation requests and can cancel those reservation requests and/or reroute the reservation requests to another NRP or to a different network provider. The timers typically are kept for a reservation request forwarded to a destination NRP. The destination NRP is provided a configurable amount of time in which to respond to the reservation request with a positive or negative response. If the destination NRP does not respond within the allotted time, a different NRP may be selected to process the reservation request. However, if another NRP cannot be located, the reservation request may be refused.

The reservation request has a format referred to herein as the reservation format. The reservation format is used by one or more devices within the NRP and/or one or more other devices within the signaling system 102 to process the reservation request. In some instances, external networks may or may not use the reservation format used by the streaming system 102. Thus, in some instances, a message received from an external network may require conversion to the reservation format. In other instances, a message to be transmitted to an external system may require conversion from the reservation format to a format receivable by that external network. Conversion may also be required if two or more NRPs exist in the streaming system 102, and at least one of the NRPs is operating a different version of software, firmware, and/or operating systems than the version used by one or more other NRPs in the streaming system.

In those instances in which the format of the reservation request requires conversion, either between one or more devices within the streaming system 102 or between a device within the streaming system and a device outside of the streaming system, the reservation controller 406 controls converting the format of the reservation request between the one or more formats and/or other protocols. Examples of some signaling protocols include the Internet Engineering Task Force (IETF) session initiation protocol (SIP), the International Telecommunications Union (ITU) H.323, the World Wide Web Consortium (W3C) Extensible Hyper Text Markup Language (XHTML), Extensive Markup Language (XML), and other protocols and private application interfaces.

Figure 5:
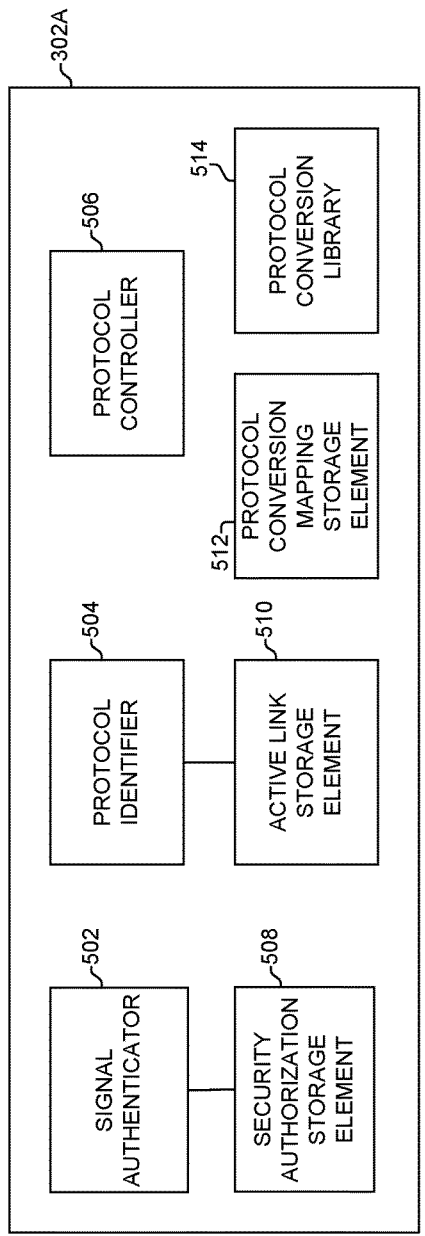
FIG. 5 is a block diagram of the name resolution system for a name routing processor system in accordance with an embodiment of the present invention.

FIG. 5 depicts an exemplary embodiment of a name resolution system. The name resolution system 306A of FIG. 5 includes a signal authenticator 502, a protocol identifier 504, and a protocol converter 506. The signal authenticator 502 operates with a security authorization storage element 508, the protocol identifier 504 operates with an active link protocol storage element 510, and the protocol converter 506 operates with a protocol conversion mapping storage element 512 and a protocol conversion library 514. The storage elements 508-514 each may be, for example, a database, a table, an array, a programming object, a computer process monitoring event that can be called via an inter process or remote process communication, and/or another storage element. For simplicity, the storage elements 508-514 may be referred to as databases.

The signal authenticator 502 operates with the security authorization storage element 508. The signal authenticator 502 determines if signaling as received from various locations is valid. The signal authenticator 502 uses data stored in the security authorization storage element 508 to verify the validity of communications received within the streaming system 102 and/or another network.

For example, the signal authenticator 502 may validate a communication by identifying the IP address of the device sending the communication and verifying that the sending IP address is valid, reading embedded security key data within the communication and validating the security key data, identifying physical device serial numbers and validating the serial numbers, identifying the signaling link as a secure link, and/or other security schemes. In another example, two internet service providers (ISPs) may agree to transmit communications between their networks. In this example, the security authorization storage element 508 may contain the IP addresses of the devices of both networks and a security key to be used when processing communications from another network, and the signal authenticator 502 will validate the communications.

The signal authenticator 502 may receive and process a communication, identify the sending IP address and a security key, and use a process and/or lookup to the security authorization storage element 508 to identify whether the IP address is listed in the security authorization storage element, to decode the security key, and to match the decoded security key to validate the information identified in the security authorization storage element. In another example, the security authorization storage element 508 may be configured as a cache of recently used security keys. In this example, the signal authenticator 502 may be configured to access a public key data store or certificate verification service to validate a security key.

In addition to the information identified above, the security authorization storage element 508 also may contain data identifying signaling network points including signaling end-points, the company that owns the signaling network point, contact information identifying the manager of the signaling network point, and/or other data. A signaling network point is a device that is addressable from a signaling standpoint. A signaling end-point identifies a signaling network point that is at one end of a communication.

The protocol identifier 504 operates in conjunction with the active link protocol storage element 510. The protocol identifier 504 maintains a list of active signaling links and information used to communicate services on each link. The protocol identifier 504 stores the signaling link information in the active link protocol storage element 510. Signaling link information may include whether the signaling link uses in-band or out-of-band signaling, protocols that may be used on or with the signaling link, what signaling links may be used as back-up signaling links to a signaling network point, including a signaling end-point, whether the signaling link is not operational and the reason therefore, whether the signaling link is active, the desired not to exceed link load limits, signaling link prioritization to a given signaling network point, a transport type, and other data useful for managing signaling links and communication paths.

The protocol converter 506 operates in conjunction with the protocol conversion mapping storage element 512 and the protocol conversion library 514. The protocol converter 506 converts communications between the reservation format and other protocols, as explained more completely above with respect to FIG. 4. The protocol converter 506 obtains protocol information from the protocol conversion mapping storage element 512, such as by identifying data elements and other protocol elements for the SIP protocol. The protocol converter 506 then can map data elements from the reservation format to the desired protocol. The protocol conversion mapping storage element 512 contains protocol identifiers for mapping protocols that have similar attributes as the reservation format, but different formatting and naming conventions.

If the conversion between the reservation format and anther protocol requires more than a simple mapping, the protocol converter 506 calls routines stored in the protocol conversion library 514. These routines typically define application programming interfaces (APIs) using an open standard, such as XHTML, XML, or another standard. APIs normally are negotiated between networks and may be considered signaling network point specific. For example, protocol conversions may be required for a routing request made on the ingress side, for a communication to the forwarding protocol, for a communication from a forwarding reply, and/or for a communication returning the results of a routing request on the egress side.

The routines in the protocol conversion library 514 may be configured to determine the protocol to be used for converting the communication and to then perform the conversion. If the protocol conversion library 514 does not contain data for the received communication, the protocol conversion library 514 and the protocol converter 506 may be configured to default to a native protocol of the streaming system 102, such as the reservation format.

FIG. 6 depicts an exemplary embodiment of a routing process for a routing engine. The routing engine 308A of FIG. 6 depicts a logical default process for routing media. However, other default processes may exist.

The routing engine 308A locates one or more MMSs and/or MMS devices that have the requested media identified by a reservation request at step 602. For example, the routing engine 308A may locate those MMSs that contain 100% of the media identified for a requested reservation. In another example, the routing engine 308A may be configured to locate the MMSs that contain the first media item to be viewed for a requested reservation and the presentation generated therefore, and subsequent media items requested in the reservation (and to be generated for the presentation) are transported to the selected MMS while the viewer receives the first media item.

At step 604, the routing engine 308A determines if the MMSs that contained the requested media have the capacity to stream the media to the viewer. The capacity is measured in current usage and future scheduled usage. For example, a viewer may request a two hour movie to be generated in the moving pictures experts group (MPEG) format requiring 4 megabytes of constant bandwidth. The routing engine 308A determines if the MMS currently has 4 megabytes of bandwidth, the appropriate processing capacity, and other capacity items.

The routing engine 308A also reviews future scheduled activity and forecasts the impact of the future scheduled activity on the capacity measures. In one embodiment, the routing engine 308A also may be configured to then generate an overall weighted average rating the ability of each MMS to stream the requested media. In one example, the MMSs scheduled to be used heavily in a live broadcast of a future event are ranked lower than the MMSs that are not transmitting the live broadcast of a future event.

At step 606, the routing engine 308A matches the selected MMSs to the streaming service configuration. As used in this paragraph, the streaming service configuration is identified by the network distribution rules and, in some instances, rules identified in an order of a program (hereafter, "program rules"). The routing engine 308A then prioritizes the MMSs that meet the network distribution rules and the program rules to determine the order in which the MMSs may be contacted to locate an MMS that can service the reservation request.

For example, a routing preference of next-sequential may prioritize a list of MMSs based upon what MMS last serviced a reservation request. In this example, a streaming system 102 may have seven MMSs. If a previous reservation request was serviced by MMS 4, then the current reservation will be serviced by the next available MMS greater than MMS 4 that can handle the reservation (i.e. the presentation generated for the reservation request). For example, MMS 5 does not have the required media requested, and MMS 6 contains all of the required media but does not have available capacity. Additionally, MMS 7 contains all of the required media and has the capacity available to stream the media. In this example, MMS 7 is the next available MMS greater than MMS 4. Thus, MMS 7 is prioritized to the top of the routing list. This prioritization in routing is referred to herein as next-sequential routing.

In another example, the streaming system 102 may be configured to use most-idle routing, thereby selecting the most-idle MMS. In this example, the list of available MMS devices that are configured to service the requested media are prioritized in order of the MMSs that have the least current and planned activity.

In another example, the routing engine 308A is configured to enable bumping for the routing process and identifies the precedents to be given to other networks over bumping. Bumping refers to a reservation request or other message being bumped for another reservation request or message. Bumping may be based on network owner policy. For example, a per-per-view viewer might have priority over a non-paying viewer. A revenue producing stream might have priority over a test stream. A company/publisher might agree to have a lower priority to obtain a lower rate. Priorities might be agreed to in a service order. Emergency-based streams might have priority over normal streams. Other examples exist.

In still another example, program rules may be entered by a media owner. However, the network owner may override the program rules if the program rules violate or are inconsistent with contractual provisions agreed upon by the parties or network distribution rules. In yet another example, a media owner may need to change a program rule but is not able to physically connect to the streaming system 102 to make the program rule change. In this example, the media owner may request the network owner to directly enter the program rule, thereby overriding routing according to that program rule. Other examples exist.

Thus, the routing engine 308A identifies the MMSs that can service requested media for a presentation at step 606.

The routing engine 308A identifies these MMSs based on which MMSs have the media and the capacity and provides a selection probability based on the selected configuration according to the network distribution rules and the program rules.

At step 608, the routing engine 308A generates an overall sorted list from 1 to N of the MMSs that can generate the requested media to the viewer. The sorted list may, for example, be based on the selection probability determined at step 606. The routing engine 308A may apply a weighted average algorithm, such as the location of each MMS with respect to the viewer, the relative capacity of each MMS, including current and planned capacity, contractual factors, and/or other selected factors. The sorted list then may be used to communicate with each MMS according to the listed prioritization to ensure that at least one MMS may stream the requested media to the viewer. If the first MMS on the list rejects the request, the second MMS on the list is contacted and so on. This process continues until at least one MMS accepts the reservation or until a treatment process is applied to the reservation request. A treatment process identifies a reason and a result for abnormal routing of a reservation request or some other signaling or communication. The treatment processes are described more completely below.

Figure 7:
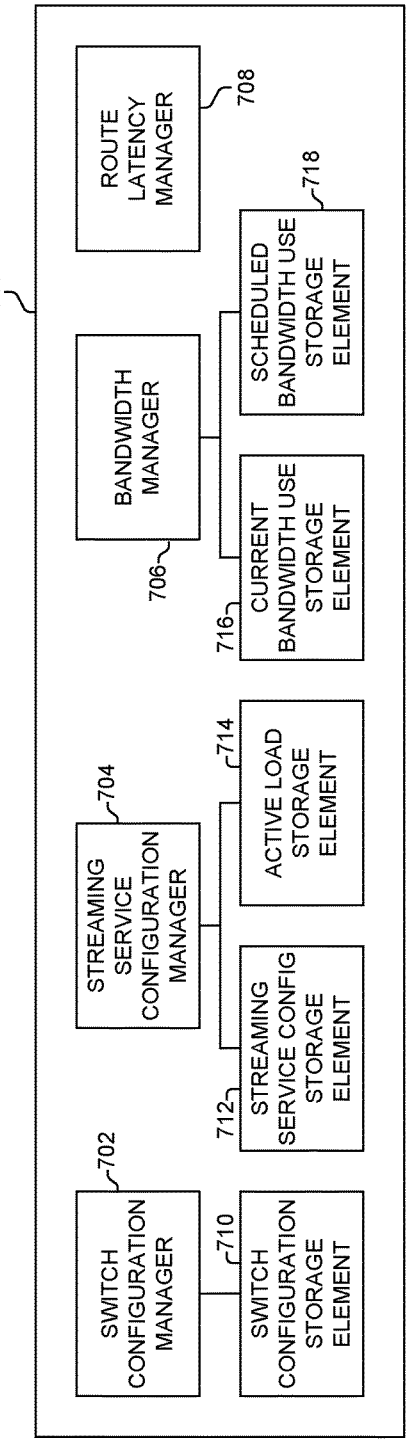
FIG. 7 is a block diagram of the switch manager for a name routing processor in accordance with an embodiment of the present invention.

FIG. 7 depicts an exemplary embodiment of a switch manager. The switch manager 310A of FIG. 7 comprises a switch configuration manager 702, a streaming service configuration manager 704, a bandwidth manager 706, and a route latency manager 708.

The switch configuration manager 702 operates with a switch configuration storage element 710. The streaming service configuration manager 704 primarily operates with a streaming service configuration (config) storage element 712 and an active load storage element 714. Secondarily, the streaming service configuration manager 704 may operate with a current bandwidth use storage element 716 and a scheduled bandwidth use storage element 718. The bandwidth manager 706 operates with the current bandwidth use storage element 716 and the scheduled bandwidth use storage element 718. The storage elements 710-718 each may be, for example, a database, a table, an array, a programming object, a computer process monitoring event that can be called via an inter process or remote process communication, and/or another storage element. For simplicity, the storage elements 710-718 may be referred to as databases.

The switch configuration manager 702 operates with the switch configuration storage element 710 to store and retrieve configuration data for one or more MMSs. The switch configuration manager 702 uses SNMP and CMIP management information base (MIB) objects and/or processes to determine the hardware configuration of one or more MMSs and/or MMS devices. The hardware configuration data is stored in the switch configuration storage element 710 and is viewable from the RTSMS 106 (see FIG. 1) for authorized users.

The switch configuration manager 702 uses the MIBs to determine if the MMS and/or the MMS devices are available for use, are in an alarm state, are otherwise awaiting repair, and/or are in a maintenance state for which the MMS or the MMS equipment is unavailable for use. The switch configuration manager 702 stores the configuration data in the switch configuration storage element 710 for each event that causes a state change in the equipment status or a service impairment status.

The streaming service configuration manager 704 stores and accesses data in the streaming service configuration storage element 712 and the active load storage element 714. The streaming service configuration manager 704 also accesses data in the current bandwidth use storage element 716 and the scheduled bandwidth use storage element 718.

The steaming service configuration manager 704 enables authorized users to view and update routing data and tables, such as the routing tables identified in FIGS. 8-11. The streaming service configuration storage element 712 contains data identifying network distribution rules, such as for how media should be routed for the entire streaming system 102, data used to control a group of MMSs, data used to determine switch prioritization to determine a list of MMSs that can provide requested media to a viewer, and other data.

For example, a sort algorithm in the streaming service configuration manager 704 may be set to next-sequential switch, least idle switch, most idle switch, switch closest to the viewer, lowest transport latency, and other approaches. In each instance, the streaming service configuration manager 704 reads the sort algorithm setting and the associated routing processing data from the streaming service configuration storage element 712.

In another example, an algorithm is set to stream media from a switch that is the closest point of service to the viewer. In still another example, a network owner may select a transport path that has the lowest transport latency through the streaming system. This switch may not necessarily be the closest switch. Transport latency is the time between when a transport communication/message is sent from a first device and when the communication/message is received at another device.

The streaming service configuration storage element 712 also maintains data identifying load factors for the streaming system 102 as a whole. The load factor data is used by the streaming service configuration manager 704 to monitor the collective load and to prevent the streaming system 102 or an individual MMS from being overloaded.

For example, the streaming service configuration manager 704 may be configured to randomly reject reservation requests when the streaming system 102 is 80% currently used. In this example, once the 80% threshold is reached, a selected random rejection rate, such as 40%, may be specified so that 40% of the new reservation requests are rejected while the streaming system 102 remains at 80% capacity. In this manner, the quality of service may be maintained for those viewers already connected to the streaming system 102. Additionally, the streaming service configuration manager 704 uses the streaming service configuration storage element 712 data to establish and maintain real-time stream controls and pre-established stream controls.

The active load storage element 714 contains data identifying the media server types operating on respective MMSs. For example, a media server may be a Microsoft Windows Media Server, an Apple Darwin Server, a Real Network Real Time Server, an Oracle Video Server, or another type of media server. For each media server, the active load storage element 714 may contain media server type, current media server status, activation start time, planned media server termination time, media server software capacity settings, media server version number, media server log settings, media server publication points for content, content file types the media server can process, and other data relevant to supplying streaming service. The streaming service configuration manager 704 also stores current streaming capacity for the media server type and identifies the time and date when changes are to be made to a media server, such as hardware or software upgrades, maintenance, or other service impairment events.

The bandwidth manager 706 monitors bandwidth use and forecasts needed bandwidth based on scheduled reservations. The bandwidth manager 706 may obtain information for future reservations, thereby identifying scheduled bandwidth use, from the scheduled bandwidth use storage element 718.

The bandwidth manager 706 accesses current streaming information from the state model to determine bandwidth currently being used. The bandwidth manager 706 also communicates with the streaming service configuration manager 704 to determine the current available capacity. The bandwidth manager 706 then generates a rolling forecast of bandwidth use and stores that bandwidth use forecast data in the current bandwidth use storage element 716. For example, the bandwidth manager 706 may identify bandwidth currently being used and identify forecasted bandwidth use based on requested and/or to be processed reservations. The bandwidth manager 706 may use this data to forecast for configurable periods of time, such as 4 hours, 24 hours, 48 hours, 5 days, or another forecast range. The bandwidth manager 706 will update the rolling forecast as additional data becomes available, such as actual bandwidth use and/or additional requested and/or accepted reservations.

The bandwidth manager 706 also may forecast the bandwidth use for each MMS based on a transport traffic pattern. A transport traffic pattern is used to measure each segment of a specified signaling link, transport path, device, and/or another segment, to determine bandwidth use so that end-to-end bandwidth use may be measured. Once usage patterns and bottlenecks are recognized, optimizations can be implemented to improve performance and bandwidth use. For example, the number of IP route locations, from a designated MMS to a desired end point are required to reach that end point. To fully identify the transport traffic pattern, the bandwidth manager 706 also may identify the millisecond delay to that location, the start/end forecast time for the pattern, actual test results recorded during the identified time period, the designation of one or more IP address types, such as a full IP address, a part of a CIDR block, and/or other transport traffic pattern attributes.

The route latency manager 708 executes tests between a selected MMS and a pre-determined network point. The route latency manager 708 may execute a test on an on-going, periodic, or one time basis and provide that information to the bandwidth manager 706. The route latency manager 708 may be configured to execute tests on a packet based transport, such as TCP/IP, ATM, frame relay, and other packet based transports. In one embodiment, the route latency manager 708 executes a test to process a TCP/IP ping and trace route command to each TCP/IP address that made a connection or session to a specific MMS in a configurable period of time, such as 24 weeks. In another example, the route latency manager 708 executes a TCP/IP ping and trace route test to each viewer that is a member of a subscription service. The test may be based upon the viewer's full IP address.

Figure 8:
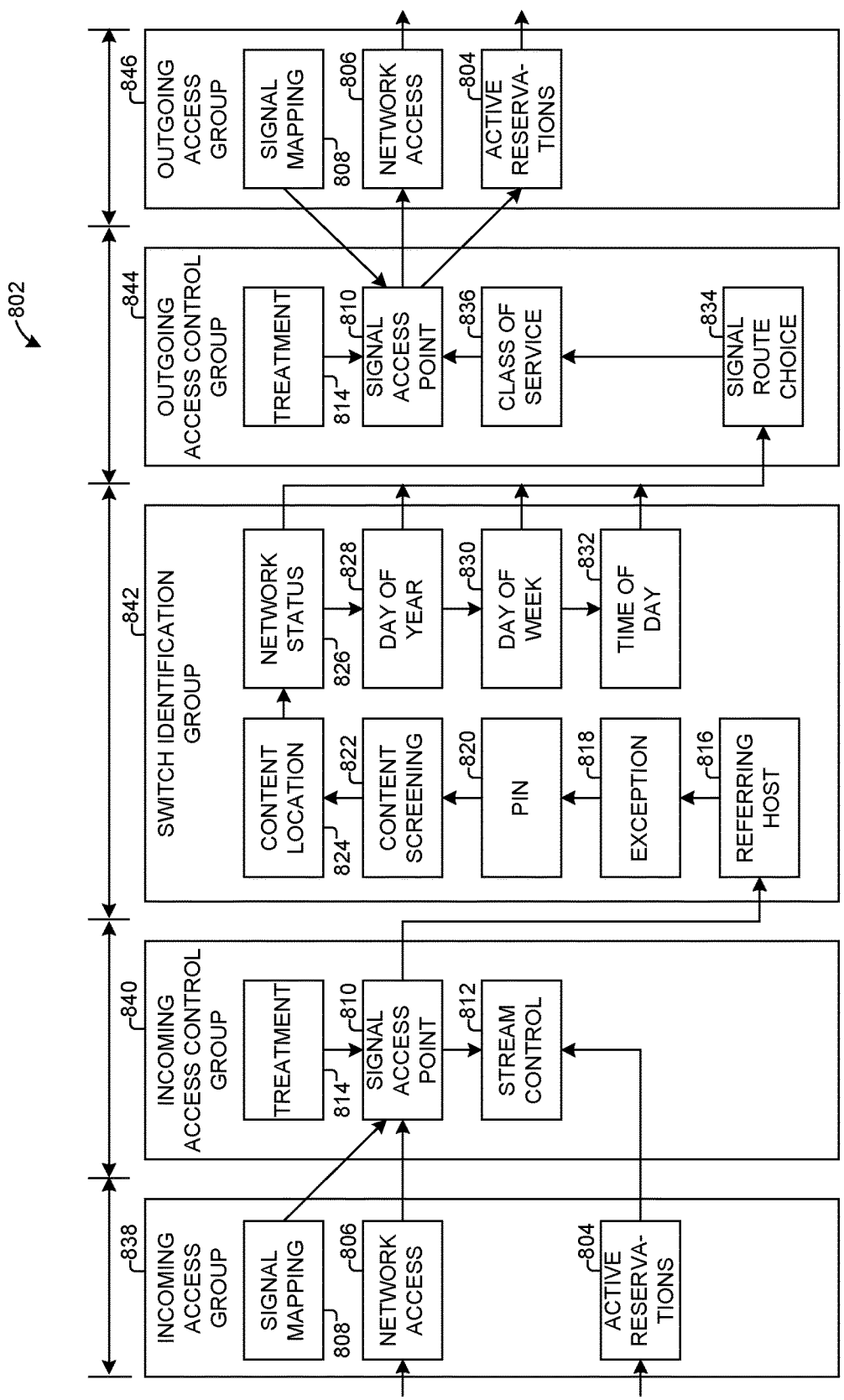
FIG. 8 is a block diagram of a routing data structure used in a name routing processor in accordance with an embodiment of the present invention.

FIG. 8 depicts an exemplary embodiment of a data structure used by an NRP to execute a state machine. The data structure is comprised as a series of tables that point to one another in various ways. The pointers may have a next function and next partition designation. The next function points to a next routing process, and the next partition points to an entry or a range of entries in the tables used for that process. While the pointers for an exemplary media processing are illustrated in FIG. 8, other examples exist. The routing data structure 802 embodiment of FIG. 8 depicts an active reservations table 804, a network access table 806, a signal mapping table 808, a signal access point table 810, a stream control table 812, a treatment table 814, a referring host table 816, an exception table 818, a personal identification number (PIN) table 820, a content screening table 822, a content location table 824, a network status table 826, a day of year table 828, a day of week table 830, a time of day table 832, a signal route choice table 834, and a class of service table 836.

FIG. 8 depicts one embodiment in which a reservation request flows through the tables of the data structure between incoming access of the reservation request through the outgoing access in which a reply is transmitted to the viewer.

The routing data structure 802 is depicted as flowing from tables in an incoming access group 838 to an incoming access control group 840. Routing then passes through a switch identification group 842 to an outgoing access control group 844. In the example of FIG. 8, the routing next flows through an outgoing access group 846. It will be appreciated that FIG. 8 depicts an exemplary embodiment in which tables for the routing data structure 802 are grouped for one exemplary routing. In other examples the tables of the routing data structure 802 may be grouped differently, one or more of the tables depicted in FIG. 8 may not be used on a particular routing, or all of the tables depicted in FIG. 8 may be used for the particular routing.

In the embodiment of FIG. 8, the incoming access group 838 receives reservations from the RTSMS 106 at the active reservations table 804. The network access table 806 receives the reservation request from the viewer. Signal mapping data from the signal mapping table 808 and reservation and viewer information from the network access table 806 passes through to the signal access point table 810. Active reservation data from the active reservations table 804 may pass to the stream control table 812. Additionally treatment information may pass from the treatment table 814 to the signal access point 810.

As a default, routing then is transmitted to the referring host table 816 in the switch identification group 842. Following, routing may pass through the exception table 818, the personal identification (PIN) table 820, the content screening table 822, the content location table 824, and to the network status table 826. In some instances, routing may then pass through time and date tables, such as the day view table 828, the day of week table 830, and the time of day table 832. Routing may pass from any of the network status table 826, the day view table 828, the day of week table 830, and the time of day table 832 to the signal route choice table 834 of the outgoing access control group 844.

The outgoing access control group 844 generally formulates information for a reply to the viewer. From the signal route choice table 834, routing may pass to the class of service table 836, to the signal access point table 810. Treatment information may be received from the treatment table 814 at the signal access point 810. Additionally, signal mapping data from the signal mapping table 808 may be received at the signal access point table 810.

The signal access point table 810 then routes reply data through the network access table 806 of the outgoing access group 846 to be transmitted to the viewer. Additionally, reservation data may be transmitted from the signal access point 810 to the active reservations table 804 of the outgoing access group 846 to be transmitted onto another network device or to another device in the streaming system 102.

It will be appreciated that the routing identified in FIG. 8 is an exemplary embodiment. Other examples exist.

The active reservations table 804 contains information required to map a presentation to an executable play script that will be processed by an MMS. Each reservation generated by the reservation system 108 of the RTSMS 106 (see FIG. 1) has an entry in the active reservations table 804. Each reservation request that has not fully executed or cancelled is depicted in the active reservation table 804.

The network access table 806 contains information used to provide the public transportation side of a connection or a session. The public transportation side typically refers to a part of the streaming system 102 or another network that is available to viewers that are not on a private, out-of-band signaling network. Typically, one record appears in the network access table 806 for each network access adapter that can stream media found on an MMS. A network access adapter typically refers to the hardware that connects a media server in an MMS to the rest of the streaming system 102 or to another media server in another network.

The network access table 806 also can be configured to hold records for private network access adapters, and the routing data structure 802 also can be configured for private network access adapters. The network access table 806 typically is accessed from the signal access point table 808, the signal route choice table 834, or an external media routing process via an internal routing process that controls media routing to and/or from an external network.

The signal mapping table 808 enables the NRP to decode incoming signaling messages from protocols other than the reservation format into the reservation format for processing by the NRP. The signal mapping table 808 also enables the NRP to alter formatting for outgoing signaling messages from the reservation format to a protocol required to be received by the destination device. When the incoming signal record is converted to the common reservation format, a signal decode message mapping type is used as a key to the signal mapping table. When an outgoing signaling record is converted from the reservation format to another format, a signal encode message mapping type is used as the key to the signal mapping table 808.

The signal mapping table 808 contains information and rules identifying the attribute names from the reservation format and how they are mapped to and from attribute data of the desired protocol to which it will be converted or from which the message will be converted. The signal mapping table 808 also identifies programming libraries that are to be called for the data conversion.

The signal access point table 810 contains information used to identify signaling network points and data links. The signal access point table 810 also contains information related to devices from which a reservation can originate, such as from a network security standpoint, devices to which the reservation request can be routed, such as from a network security and capacity/availability standpoint. The signal access point table 810 also contains information identifying signaling protocols used to communicate with other signaling network points. The signal access point table 810 may point to any switch identification group 842 table, the class of service table 836, the signal mapping table 808, the stream control table 812, and the signal route choice table 834.

The stream control table 812 enables the NRP to manage network overload conditions without fully processing a reservation request. This prevents the NRP and the MMS from shutting down fully and not providing service at all. A network/streaming system overload condition may occur when all available resources in a device nears capacity. For example, in the event of a disaster, there may be a spike in viewer interest for a particular piece of news footage of the event. The number of results and requests may cause the MMS to fail thereby causing everyone currently viewing any media to be disconnected and causing all new reservation requests to be rejected.

The stream control table 812 enables a network owner to throttle reservation requests, thereby maintaining service to viewers currently connected. The stream control table 812 further enables a network owner to reject a portion of new reservation requests with minimal NRP resources needed. The amount by which reservations may be throttled is configurable.

The treatment table 814 contains information identifying protocol errors, network operation errors, and other events identifying why a streaming service is not provided. The treatment table 814 may identify the reason for the error and provide the reason to the viewer with an adequate explanation of the error. For example, if a reservation request identifies media requiring an access code, but the access code is not provided within the reservation or a subsequent communication, the reservation request will be sent to the treatment table 814 causing a message to be generated to the viewer that the code has not been entered or is incorrect.

The treatment table 814 identifies special actions to be taken in the course of processing a reservation request. For example, a cable operator may want to stream a media clip for a message stating that their video-on-demand ordering system is not operational because of maintenance, instead of sending a text error message to the set top box to be displayed on the viewer's television. In another example, the treatment table 814 might be accessed from the PIN table 820 to block media that contains unacceptable subject matter. The owner of the set top box could request that specific media be blocked from the set top box in the living room, but allowed to be viewed on the set top box in another room. In this instance, the set top box identification is used in the PIN table 820 to treat the living room set top box with a video message stating that the customer has forbidden this material to be displayed via that particular set top box.

The referring host table 816 contains information identifying routing for a reservation request based on which entity referred the reservation request to the streaming system 102. For example, an internet based reservation request may use a URL of the hypertext transfer protocol (HTTP). The URL may contain the name of the referring web portal. An agreement between the web portal owner and the network owner of the streaming system 102 may require routing to a specific MMS, to another device, or other specific routing instructions. The referring host table 816 typically defaults to the exception table 818. Although, the referring host table 812 may point to other tables.

The exception table 818 is used to identify various exception conditions related to the reservation request. The exception conditions may influence the routing or handling of media identified in the reservation request. A reservation request may be screened resulting in the routing taking a different path through the routing data structure 802. This may occur based on multiple factors, such as a special contractual agreement between one or more of a viewer, a network owner, another network owner, a media owner, and/or another entity. For example, if a reservation request is an internet originated request coming from a specific party, special routing directly to a specified MMS may be required.

The exception table 818 contains information enabling a reservation request to be specially handled, that is screened, based, at least in part, on the identification of the originating network owner. The identification of the originating network owner may be determined from a full or partial IP address, the viewer's media player software version information, and/or access network packet type information, such as ATM, frame relay, cable, and/or IP. The exception table 818 typically defaults to the PIN table 820. Although, the exception table 818 also may point to any other switch identification group 842 table, the signal route choice table 834, or the class of service table 836.

The PIN table 820 is used to identify any special characteristics or requirements related to a viewer, such as a protocol required to communicate to the viewer's media player, screening required to block fraudulent account use, default time zone information, content rating blocking, and other characteristics. The PIN table 820 can identify a single viewer or a group of viewers, and the identified viewer characteristics may be configurable by the network operator. The PIN table 820 typically defaults to the content screening table 822. Although, the PIN table 820 may point to any other switch identification group 842 table, the signal route choice table 834, and the signal mapping table 808.

The content screening table 822 is used to screen a program or individual media during a routing process. A media owner may place media on the streaming system 102 that the network owner does not desire or that violates or is inconsistent with an agreement with the network owner. The content screening table 822 contains information that enables the media to be screened for those undesirable or inconsistent attributes. The content screening table 822 contains media information, such as a program identification, media identification, media format type, media rating type, agreement based information, and other data generated by the ESRP 106. The content screening table 822 enables a network owner to override instructions of a media owner located in a program. The content screening table 822 typically defaults to the content location table 824. Although, the content screening table 822 may point to any other switch identification group 842 table and the treatment table 814.

The content location table 824 identifies the media located at specific MMSs within the streaming system 102 or in another streaming network. The content location table 824 contains information identifying media, such as a maximum transmission bandwidth required, an estimated play time of the media, a digital media file size, a content rating, and other media information. The content location table 824 typically defaults to the network status table 826. Although, the content location table can point to any other switch identification group 842 table and the treatment table 814.

The network status table 826 determines the current MMS capacity available and the transport latency from each MMS to one or more viewer locations. The network status table 826 may contain network information, such as current usage of a processor of an MMS, available and used media storage, in-use and planned bandwidth, and in-use and planned media transport. The network status table 826 also identifies capacity. The capacity is adjusted for any hardware failures that currently are open and that impact media distribution to viewers. The network status table 826 typically defaults to the signal route choice table 834. Although, the network status table 826 also may point to any other switch identification group 842 table and the treatment table 814.

The day of year table 828 contains information that causes media or programs to be routed differently based on the day of the year. The day of the year table 828 typically defaults to the signal route choice table 834. Although, the day of year table 828 also may point to any other switch identification group 842 table or the treatment table 814.

The day of week table 830 contains information that causes media or programs to be routed differently based on the day of the week. The day of the week table 830 typically defaults to the signal route choice table 834. Although, the day of week table 830 also can point to any other switch identification group 842 table and the treatment table 814.

The time of day table 832 contains information that causes media or programs to be routed differently based on the time of day. The time of day table typically points to the signal route choice table 834. The time of day table also may point to any other switch identification group 842 table and the treatment table 814.

The signal route choice table 834 identifies alternative signal access points that may be used to complete a reservation request. The signal route choice table 834 identifies one or more NRPs within the streaming system 102 and/or another network that are interconnected to each other and/or other networks.

The signal route choice table 834 may select a secondary NRP, for example, when a first selected NRP cannot process a reservation request because all of the MMSs that the first NRP controls are busy. Thus, if a first NRP cannot service a reservation request, such as when all MMSs for which the NRP has primary control are not able to process the reservation request, the signal route choice table 834 may select another NRP and/or MMS. The signal route choice table 834 typically points to the treatment table 814 or the signal access point table 810. Although, the signal route choice table 834 may point to the class of service table 836, the signal mapping table 808, the stream control table 812, and other tables.

The class of service table 836 identifies protocols that are not compatible with each other. The class of service table 836 may be accessed using a class of service partition code provided by the signal access point table 810. The class of service partition code typically is required from the access point records for both the originating signaling network point and the terminating signaling network point. If the protocols on the two signaling network points are incompatible, the class of service table 836 typically will point to the signal route choice table 834, thereby enabling another terminating signaling network point to be selected. Although, the class of service table 836 may point to the treatment table 814, the exception table 818, and other tables.

An initial reservation request typically is processed by the active reservations table 804. The active reservations table 804 points to the signal access point table 810 or the stream control table 812. The signal access point table 810 will identify if the reservation data is being received from a valid source, if signaling is in-band or out-of-band, identify the network owner of the sending signaling network point, the signaling protocol type, and other information about the signaling network point sending the reservation request. The state machine described above and the routing data structure 802 uses this information to decode the reservation request and the signaling data received. Typically, the decoding is completed in the signal mapping table 808 and the network access table 806. Once the reservation request, the originating signaling network point, and the originating transport network are determined and recorded, the next default table to be accessed is the referring host table 816.

FIG. 9 depicts an exemplary embodiment of a stream control table 812A. The stream control table 812A of FIG. 9 comprises a stream percent skipped table 902 and a stream rate table 904. The stream percent skipped table 902 and the stream rate table 904 are used to control the number of reservation attempts made on the streaming system 102 or an individual MMS within the streaming system.

The stream percent skipped table 902 is used to control streamed connection attempts based on a percent value of the traffic that is processed through the state machine. The stream percent skipped table 902 typically defaults to the signal access point table 810 or the treatment table 814.

The stream rate table 904 is used to control stream attempts on an attempt per second basis. Preferably, attempts within a range of 100 per second to 1 per minute are programmable. Although, ranges above and below that are configurable. The stream rate table 904 typically defaults to the signal access point table 810 or the treatment table 814.

FIG. 10 depicts an exemplary embodiment of a network status table 826A. The network status table 826A of FIG. 10 comprises a switch equipment status table 1002, a signal network status table 1004, a public network status table 1006, and a transport latency table 1008. It will be appreciated that other tables may be included in other embodiments of the network status table 826A.

The switch equipment status table 1002 identifies components within each MMS that are used to supply streaming and signaling services to one or more network devices, such as to one or more viewers. The switch equipment status data may be collected via a common systems management approach, such as SNMP, CMIP/CMISE, or a vendor specific management system. The switch equipment status may be collected by a management system, such as the RTSMS 106 (see FIG. 1), and transmitted to the NRP 110 for storage in the switch management status table 1002 and other tables where necessary. Switch equipment status data may include, for example, disk size, order numbers, media file names and sizes, switch identification numbers, and/or other media and/or switch attributes.

The signal network status table 1004 identifies packet signaling and transport links and devices. For example, a signaling link may be IP based communicating via an ethernet card in a computer. The ethernet card and its status would be identified in the signal network status table 1004. Also identified would be the status of other signaling network points and their devices. For example, a signaling network point may be unavailable due to maintenance activity. The inactive status of the signaling network point will be identified in the signal network status table 1004.

The public network status table 1006 identifies packet routing devices that are within a physical facility in which the MMS is located, but are not solely dedicated for use by the MMS. For example, an MMS may be installed at an ISP location, which would require all IP requests to be routed through the ISP's routing equipment. This equipment may be used by multiple services at the ISP site. In this example, the public network status table 1006 identifies the service status of this equipment, including any degradation of service status for the equipment. The data identified in the public network status table 1006 may be obtained, for example, via a common systems management approach, such as SNMP, CMIP/CMISE, specific test routines contained within an MMS, and other methods.

The transport latency table 1008 identifies data for latency between an MMS and various points within the streaming system 102 or another packet network. The latency data may be created and/or obtained by one or more MMSs and forwarded to the NRP 110 (see FIG. 1) on a configurable basis. For example, an MMS might use an IP based ping test to test every IP class C address that the MMS serviced within the last 7 days. This test may be repeated on a 5 minute basis, and the results would be forwarded to the NRP 110 and, possibly, to the RTSMS 106 (see FIG. 1). The transport latency table 1008 also may contain latency forecasts generated from the RTSMS 106.

FIG. 11 depicts an exemplary embodiment of a treatment table access point 1102 for the tables depicted in FIG. 8. The access point to the treatment table 814 is depicted by incoming access for a reservation request, incoming access control for a reservation request, switch identification and selection, outgoing access control for a reply, and outgoing access for a reply. The treatment table access point table 1102 identified in FIG. 11 depicts typical access points. However, in some instances, the tables may access the treatment table at other access points.

In the example of FIG. 11, the active reservations table 804 accesses the treatment table 814 at the incoming access point. The network access table 806 accesses the treatment table at the outgoing access point. The signal mapping table 808 and the signal access point table 810 typically may access the treatment table 814 at the incoming access control point and the outgoing access control point. The stream control table 812 typically accesses the treatment table 814 at the incoming access control point. The referring host table 816, the exception table 818, the PIN table 820, the content screening table 822, the content location table 824, the network status table 826, the day of year table 828, the day of week table 830, and the time of day table 832 typically access the treatment table 814 at the switch identification and selection access point. The signal route choice table 834 and the class of service table 836 typically access the treatment table 814 at the outgoing access control point.

FIGS. 12-29 depict examples of tables described in FIGS. 8-11. It will be appreciated that other versions of the tables may exist. In addition, information identified in the tables of FIGS. 12-29 may be combined or changed to form different, additional, or fewer tables.

Figure 12:
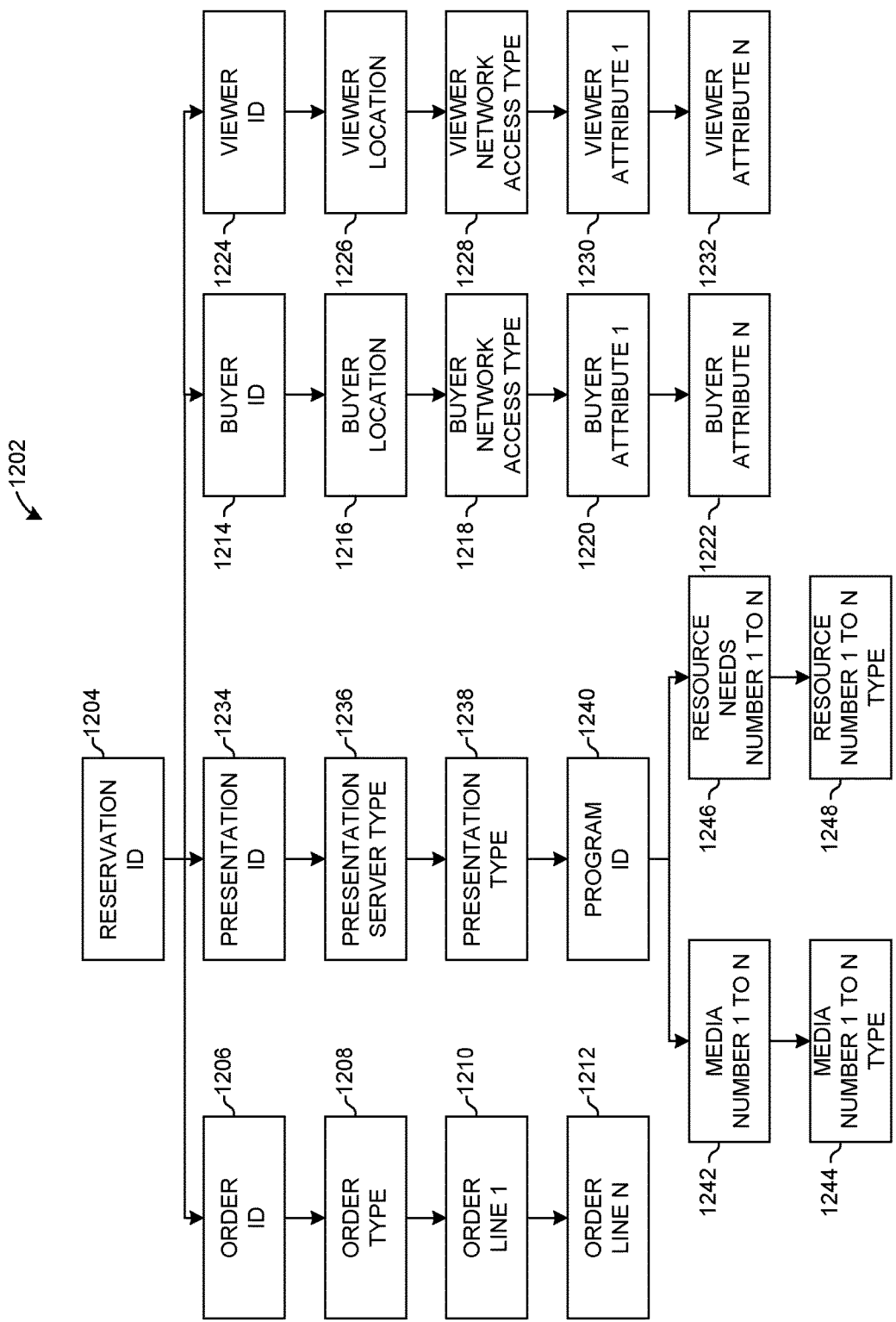
FIG. 12 is a block diagram of an active reservation table in accordance with an embodiment of the present invention.

FIG. 12 depicts an exemplary embodiment of an active reservations table. The active reservations table 1202 of FIG. 12 is used to access information identifying one or more reservations for one or more presentations. The active reservations table 1202 also is used to provide information identifying a terminating signaling network point for streams originating at other network signaling points or NRPs within a same network, such as the streaming system 102. The reservation identification (ID) 1204 of the presentation is used to enter the active reservations table 1202.

The active reservations table 1202 contains the order and presentation information generated during the reservation process. In the embodiment of FIG. 12, the order information includes the order identification (ID) 1206, the order type 1208, and the individual order line 1 1210 to order line N 1212. An order line, for example, may reference a program for a service order or may reference a media for a storage order. Other examples for other orders exist. Specific rules may exist for the order line above what the order as a whole contains. For example, a program may combine several pay-per-view events. This may include a first event where the service is charged every 30 minutes of viewing time and the viewer orders an hour. In another example, a viewer is a subscriber on a monthly basis and purchases a pay-per-view program at a special promotion rate because that viewer is a subscriber.

The order lines 1210-1212 can be associated on a one-to-one basis with the media being streamed to a viewer. For example, if an originating network cannot deliver a presentation or the remainder of a presentation, the originating network may try to locate one or more other networks to broker the delivery of the media to the viewer. The order data may be used to inform the other network the pricing value of the reservation and the estimated fee for providing a streaming service to the viewer. Other uses, for example, include determining the routing through one or more other networks based on a selected fee structure. In one embodiment, the presentations that generate more revenue for a network owner receive priority during the table processing.

The active reservations table 1202 also contains information identifying the buyer of the media. The buyer may be an individual or organization that is purchasing media or services, such as a pay-per-view presentation, a subscription service, a registration with a portal to view advertising supported content, and/or other media and/or services. The buyer data includes the buyer's identification (ID) 1214, the buyer's location 1216, and the buyer's network access type 1218. The buyer location 1216 may be, for example, an NPA-NXX or a zip code. The buyer's network access type 1218 may be, for example, internet, cable, broadband wireless, ATM, or another type.

The buyer data also includes a buyer attribute 1 1220 to buyer attribute N 1222. The buyer attributes 1220-1222 may be configurable by the network owner. For example, the network owner may create buyer profiles based on data, including age, sex, income level, the amount of business occurring between the buyer and the network owner in a period of time, the buyer's viewing and/or purchasing history, and/or other attributes.

The active reservations table 1202 also contains information identifying the viewer of the presentation. The viewer may be the same individual or entity as the buyer or another individual or entity. The buyer may establish viewer accounts and profiles. For example, a buyer may be a head of a household and may establish viewers for each of the buyer's children and set their viewing profiles accordingly. The viewer information may include the viewer identification (ID) 1224, the viewer location 1226, and the viewer network access type 1228. The viewer information also may include a viewer attribute 1 1230 to a viewer attribute N 1232. The viewer attributes 1230-1232 may include, for example, age, sex, income level, content screening level, the viewer's viewing history, and/or other viewer attributes.

The active reservations table 1202 also contains information identifying the presentation requirements. The presentation data includes the presentation identification (ID) 1234, the presentation media server type 1236, the presentation type 1238, and the program identification (ID) 1240. Alternately, a media identification may be included in place of the presentation identification in some embodiments. The presentation type 1238 may be, for example, audio, video, images, a combination thereof, or another type. The presentation data also includes for each piece of media, the media number 1242 and the associated media number type 1244 for each media 1 to N. The media number and media number type will be included for each media in a presentation. Likewise, an associated resource number 1246 and an associated resource number type 1248 will exist for each resource 1 to N.

Figure 13:
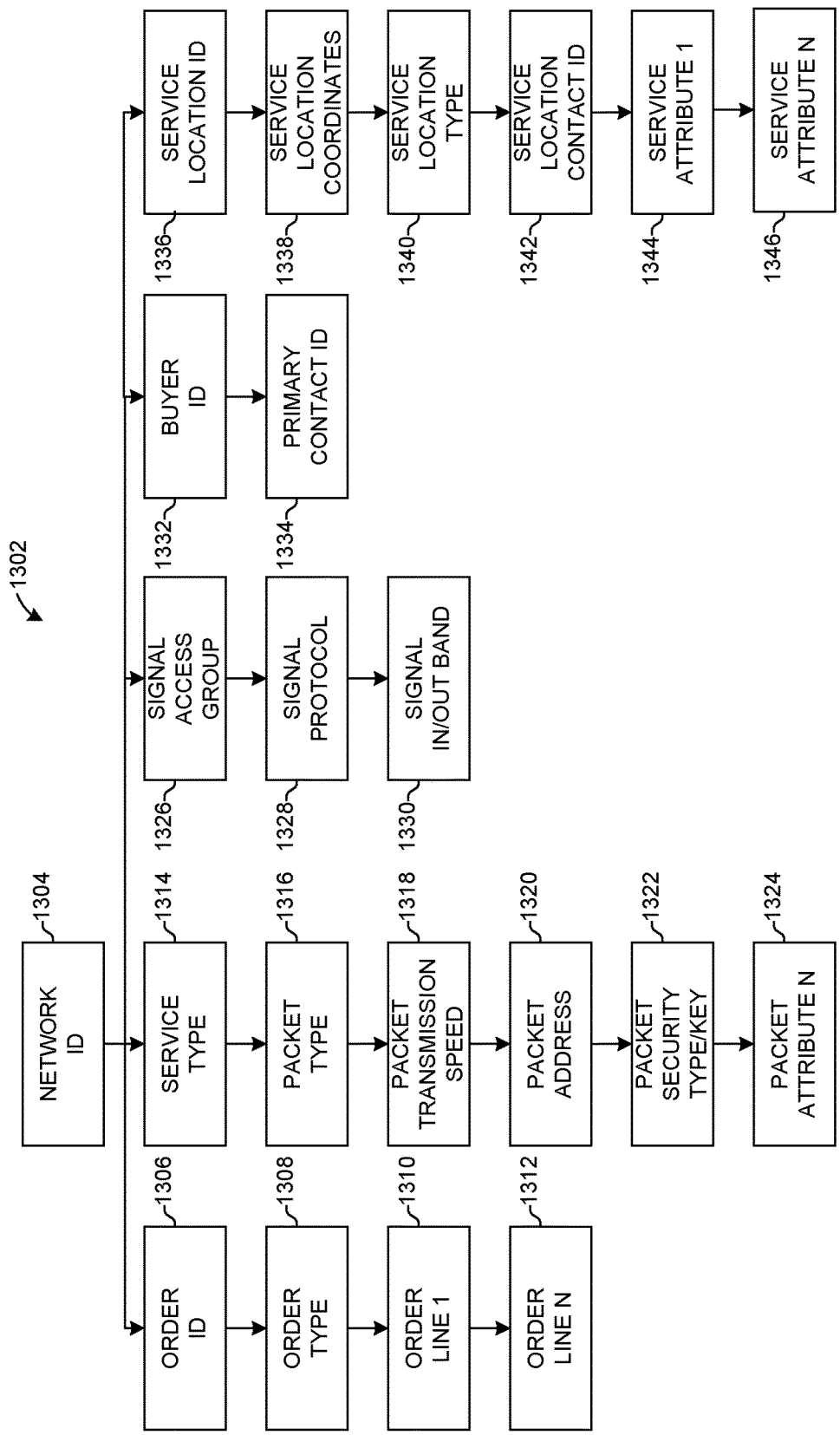
FIG. 13 is a block diagram of a network access table in accordance with an embodiment of the present invention.

FIG. 13 depicts an exemplary embodiment of a network access table. The network access table 1302 of FIG. 13 is used to identify information for packet network connections. The network access table 1302 is accessed via a network ID 1304 from the active reservations table 804. The packet address closest to the viewer may be used as a default.

Although, other packet addresses may be used. For example, a buyer's packet address or a referring portal packet address may be used.

A packet address format may be dependant upon the type of transport and the protocol being used. For example, an internet access would use an IP address format. In another example, a cable network using ATM to the home may use a packet address format identifying a virtual path/virtual circuit (VP/VC).

The network access table 1302 may contain order information generated during a customer set-up process. The order information may contain an order identification (ID) 1306, and order type 1308, and individual order lines from order line 1 1310 to order line N 1312. The order lines 1310-1312 may be associated on a one-to-one basis with the network ID 1304. For example, if the network ID 1304 identifies a buyer's home address, the order lines 1310-1312 might identify the buyer as a subscription customer that is paying for advertising/free viewing. In another example, the packet address might identify an internet portal site and reflect the fee arrangements with that site. The order data typically reflects the default billing arrangements for the packet address that is provided. If no other billing data is generated via other processes, the default data is used.

The network access table 1302 also contains packet service information that is associated with the network ID 1304. In the example of FIG. 13, only one packet service is associated with the network ID 1304. However, multiple packet services and multiple packet protocols may exist and may be supported. For example, an ATM packet network may use a native transport for a VP/VC and also use TCP/IP as an upper protocol layer for its transport device. In this example, two sets of service data would be entered.

Service data may include a transport service type 1314, packet type 1316, packet transmission speed 1318, and packet address 1320. The packet service type 1314 may include, for example, ATM, frame relay, internet, intranet, cable, and/or another service type. A packet type 1316 may identify the packet protocol associated with a network ID 1304, such as high speed digital subscriber line (HSDSL), VP/VC, IP address, and others. The packet transmission speed 1318 identifies the maximum transport bit rate.

The packet address 1320 may identify the full packet addressing scheme needed to reach a network end point, such as a VP/VC for an ATM connection or an IP address for an internet connection. Although, it is not necessary that the full packet addressing scheme be provided. The packet network sometimes dynamically controls the last portion of the addressing assignment. In that event, the packet address may be only a partial. For example, if an ATM network dynamically assigns the virtual circuit, then the data contained in the packet address 1320 is the virtual path. In another example, if an internet customer's ISP uses a dynamic host configuration protocol (DHCP) option of the IP protocol, then the packet address 1320 is the IP class C address.

The service information also may contain the packet security type and key 1322. If the packet address is using a secure connection, the security type and security key, if existent, will be required for encryption and/or decryption. Thus, the security type and any existent security key is stored.

Other packet attributes 1324 may be included. For example, a network owner might want to add the last time point and quality of service test results or an indicator that a service is always on.

The network access table 1302 also contains data that associates the network ID to a signal access group. The signal access group 1326 is the key to enter the signal access point table shown in FIG. 15. Additional signal data may include the signal protocol 1328 and an in-band/out-of-band signal indicator 1330. The signal data identifies where the billing and service control information for the network ID 1304 is transported and in what format.

The network access table 1302 also may contain key data referencing a buyer. The buyer data may include the buyer identification (ID) 1332 and a primary contact identification (ID) 1334. The buyer ID 1332 and the primary contact ID 1334 may be used for default billing arrangements and contact information for a location. This buyer information enables a network operator to access the information stored in the RTSMS 106 (see FIG. 1) to obtain a complete set of information identifying the network ID 1304, such as a street address, a billing cycle cut off date, and other general information.

The network access table 1302 also contains data referencing a service location. The service location information may include a service location identification (ID) 1336, service location coordinates 1338, a service location type 1340, a service location contact identification (ID) 1342, and service attributes 1 to N 1344-1346. The service location ID 1336 and the primary contact ID 1334 are used for contact information for the service location. This enables multiple service locations to be established under one buyer ID 1332. This service location data also enables a network operator to access data in the RTSMS 106 (see FIG. 1) to obtain a complete set of information identifying the service location, such as a street address or other general information.

Figure 14:
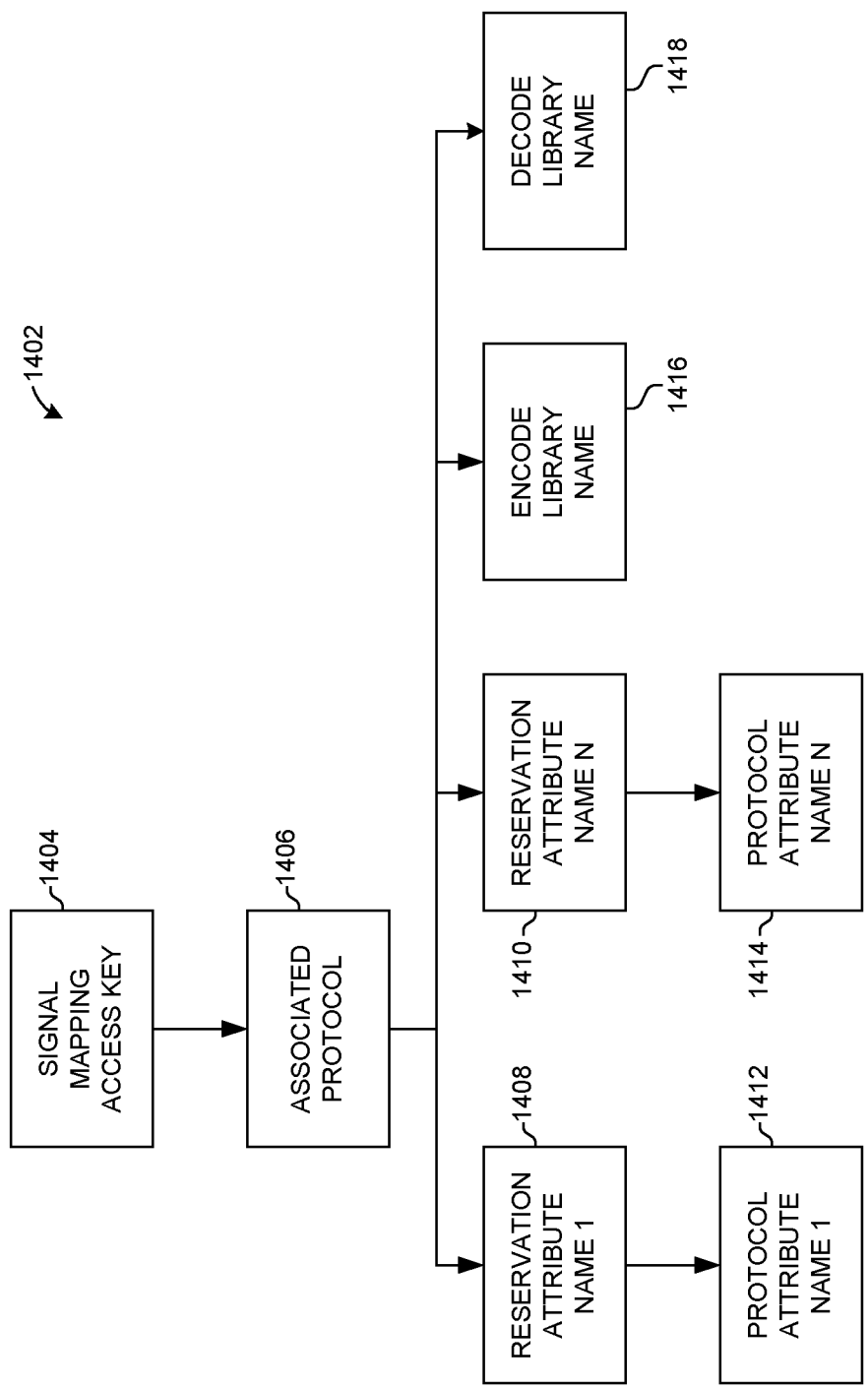
FIG. 14 is a block diagram of a signal mapping table in accordance with an embodiment of the present invention.
Figure 15:
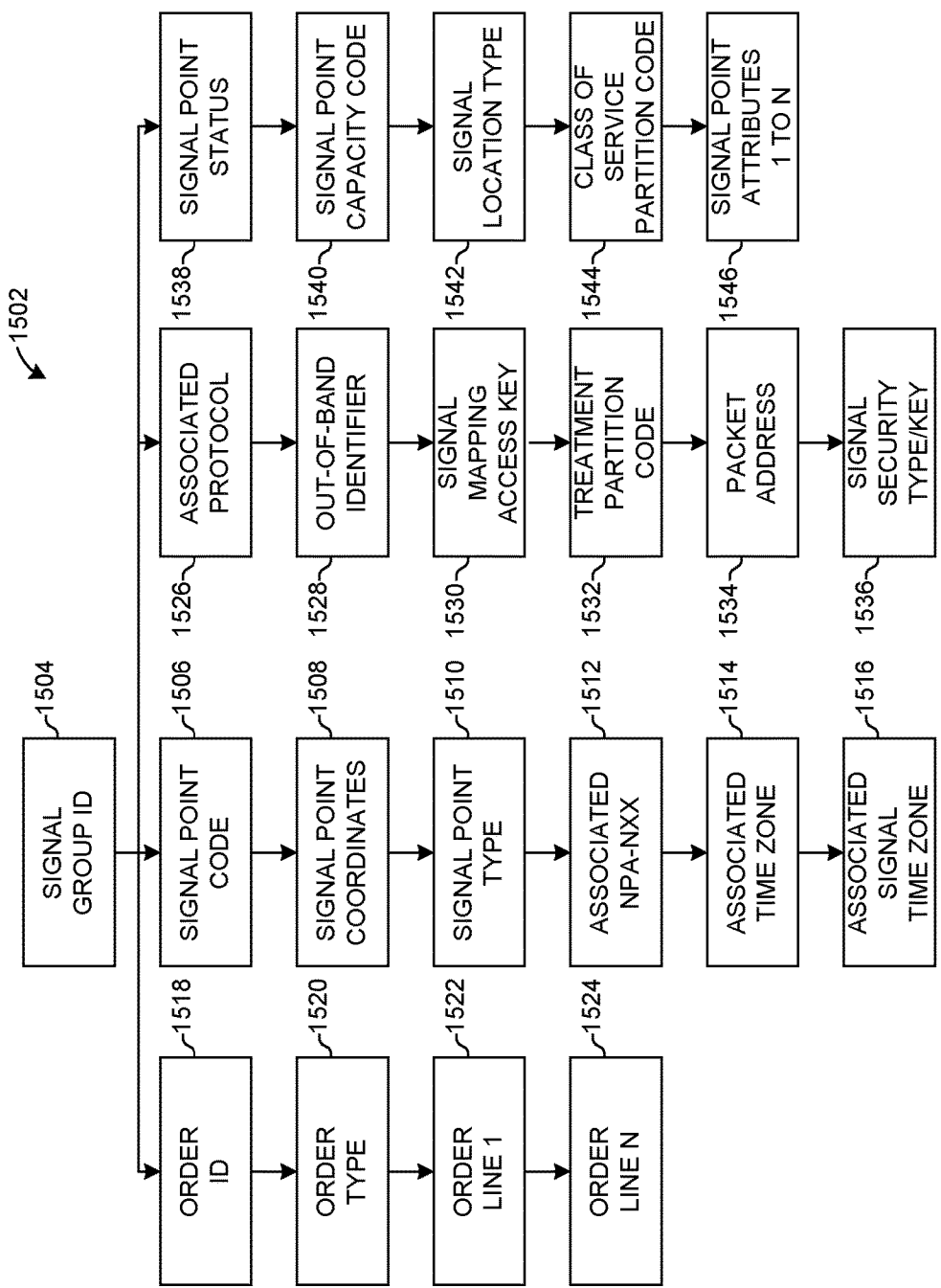
FIG. 15 is a block diagram of a signal access point table in accordance with an embodiment of the present invention.

FIG. 14 depicts an exemplary embodiment of a signal mapping table. The signal mapping table 1402 of FIG. 14 is entered using a signal mapping access key 1404. The signal mapping access key 1404 may be identified using a signal access point table 810. The signal mapping table 1402 will be processed if the signal access mapping key 1404 and an associated protocol (such as shown in FIG. 15) below contain valid data for the signal group ID being selected from the signal access point table 810.

The signal mapping table 1402 maps data attributes from one protocol to another. For example, an originating signaling network point may use the IETF RTSP protocol, and a terminating network signaling point may use the IETF SIP protocol. The signal mapping table 1402 will map data attributes from the internal reservation format used by the signaling system 102 to the corresponding data attribute names for the SIP protocol and/or the RTSP protocol.

In another embodiment, an incoming signaling protocol might use a proprietary API, and the signal mapping table 1402 will map data attributes from the API protocol to the internal reservation format used by the signaling system 102. Signal message conversion may occur on inbound signaling, outbound signaling, or in both directions if needed. Thus, the signal mapping table 1402 contains the first reservation attribute name 1408 to the Nth reservation attribute name 1410. Likewise, the signal mapping table 1402 contains the corresponding first protocol attribute name 1412 to the Nth protocol attribute name 1414.

The signal mapping table 1402 also identifies routines for encoding and decoding protocols. The routines are located in the encode library name 1416 and the decode library name 1418. Routines are processes that convert data attributes from one protocol to another protocol and provide other protocol rule enforcement. For example, a protocol, such as the IETF SIP protocol, may specify time frames for a response and send data in multiple transmissions. The routines monitor these types of rules and handle any signaling errors that might result from improper message formats, improper send/receive timing of messages, such as a time out, and other protocol specific logic that is required.

FIG. 15 depicts an exemplary embodiment of a signal access point table. The signal access point table 1502 provides signaling data for one or more groups of network access points. Entries are made into the signal access point table 1502 using a signal group identification (ID) 1504.

The signal access point table 1502 assigns one or more unique signal point codes 1506 to each signaling device registered to provide streaming service. A signal point code is associated with every record in the network access table 806 that transmits any form of signaling data. Information identifying the physical location of a signaling point is collected. In the example of FIG. 15, the physical location information may include signal point coordinates 1508, such as vertical and horizontal coordinates that normally would be present in an IP based signaling device, such as a router or a DNS server. Optionally, an NPA-NXX 1512 associated with a service site phone number, a time zone 1514, and a signal time zone 1516 associated with the location of the signaling device may be stored.

The signal access point table 1502 includes order reference information and default billing information. The order reference and default billing information may be used to determine how streaming costs are to be allocated. The order reference and billing information identified in FIG. 15 includes an order identification (ID) 1518, an order type 1520, and order lines 1 to N 1522-1524. In one example, the order ID 1518, order type 1520, and order lines 1522-1524 may be used during a stream connection processing to inform another signaling network point how billing for this streaming service transaction is to take place between two separate networks that are being required to deliver the streaming service. In another example, the order information may be used within the streaming system 102 to assign costs to different departments for a profit/loss analysis.

The signal access point table 1502 also includes information identifying the protocols used for signaling over a packet link. The example of FIG. 15 depicts only one protocol. However, multiple protocols and multiple protocol attributes may be used for a single packet link or multiple packet links. The protocol information includes an identification of the signal access point associated protocol 1526. The associated protocol defines what protocol is being referred to for the protocol attributes. An out-of-band identifier 1528 is set when a protocol uses a separate packet link or communication transport than is being used to deliver the streaming service. A signal mapping access key 1530 identifies a link to the signal mapping table 808. A treatment of the partition code 1532 identifies the link into the treatment table 814 for error handling or a rejection of service. The packet address 1534 and the signal security type/key 1536 also may be obtained for the signaling network point.

The signal access point table 1502 also includes operational data for a signaling network point. The operational data may be used by a network operator to manage signaling traffic links. The signal point status 1538 informs a network operator if the signal link is operational, not operational due to a scheduled maintenance or other reason, or is in an alarm status. The signal point capacity load 1540 typically identifies a percentage variable that a network operator sets to establish the bytes per second to be transmitted across the signaling link. For example, a network owner may set the signal point capacity load 1540 to between 33-38 percent.

Once a signaling link reaches the identified capacity, another signaling route will be selected unless none exist. Other ranges may be selected.

The signal location type 1542 is identified as well as a class of service partition code 1544. The class of service partition code typically is one-half of a key to a class of service table 836. The second half of the key to the class of service table 836 typically is found on a corresponding signal group record for the other signaling network point. This enables the routing data structure 802 to determine if the signaling protocols on each signaling network point are compatible either directly or via a conversion process. The network owner also can configure other signal point attributes 1 to N 1546 to be placed in the signal access point table 1502 to aid in the management of the signaling network.

FIG. 16 depicts an exemplary embodiment of a stream percent skipped table. In the stream percent skipped table 1602 of FIG. 16, a partition code 1604 is used to enter the table. The network identification (ID) 1606 is the second portion of the key to enter the table and can enable the identified percent to skip control to be applied only to that network. If the network ID 1606 is left blank, the control will be applied to all traffic accessed by the partition code 1604. The percent to skip 1610 is the control percentage that specifies the percentage of incoming streams that will be affected by the control. The next function 1612 allows attempts for a stream connection to be routed to another table during stream processing. The next partition 1614 points to an area within the next function table for further stream processing.

FIG. 17 depicts an exemplary embodiment of a stream rate table. The stream rate table 1702 uses a partition code 1704 to enter the table. The network identification (ID) 1706 can be used as a secondary key that enables the stream rate control to be applied only to those streams originating from the network ID. If the network ID 1706 is left blank, the stream rate control will be applied to all traffic that accesses the stream rate partition code 1704. The stream rate 1710 specifies the number of streams that will be passed by the control on or for completion of processing. This information will be used to determine if an incoming reservation falls within the stream rate control. The next function 1712 allows attempts for a stream connection to be routed to another table during stream processing. The next partition 1714 points to an area within the next function table for further stream processing.

FIG. 18 depicts an exemplary embodiment of a treatment table. The treatment table 1802 of FIG. 18 is entered using a partition code 1804. The error number 1806 specifies an error code received during processing. The error number 1806 will be processed for a given partition code 1804. This enables the network owner the ability to handle the same error differently depending on error conditions. For example, a viewer attempting to view restricted content may be handled using a variety of approaches. In a first example, the viewer may attempt to see restricted content during peak network load hours. The network owner may send the reservation request to treatment so that a text message requiring fewer network resources is displayed. In another example, the viewer may attempt to see restricted content during non-peak load hours. The network owner may send the reservation request to treatment so that a video-based message is streamed to the viewer explaining that the buyer of the service has restricted the content from being viewed.

The exception table 1802 also contains an error class 1808 for the partition code 1804. The error class 1808 may be used when sending an error message via an open system network management standard, such as with SNMP or CMIP. The error partition code 1810 combined with the error class 1808 may be used to access a detailed description of the error. The message media identification (ID) 1812 identifies the message that will be streamed by an MMS if a network owner desires a video and/or audio message to be generated to the viewer. The next function 1814 and next partition 1816 identify the next table and area within the table for further stream processing.

FIG. 19 depicts an exemplary embodiment of a referring host table. The referring host table 1902 is used to route traffic based on the originating network owner or a URL. The referring host partition code 1904 is used to enter the referring host table 1902. Different routing algorithms may be created and stored for the same referring location by creating multiple referring host partition codes for the same location.

The referring host table 1902 contains an element identification (ID) 1906 that is generated as an identifier by the RTSMS 106 (see FIG. 1). The element ID 1906 describes the type of referring device for this record. A referring device may be, for example, a website URL, a set top box, a cable network head, or another packet network capable of originating streaming requests. The referring site reference 1908 is the identification of the location originating the streaming request. The referring site reference may be, for example, a web portal, a pay-per-view cable head, the medium access control (MAC) address of the set top box at a customer's home, or another identification.

The referring host service type 1910 designates whether the referring host is a public internet service, a corporate intranet service, a private network delivery service, such as a cable or satellite network, or another type of service. The next function 1912 allows attempts to be routed to another table during stream processing. The next partition 1914 points to an area within the next function table for further stream processing.

The referring host table 1902 also contains order information generated during the referring host customer set up process. The order information contains the order identification (ID) 1916, the order type 1918, and order lines 1 to N 1920-1922. The order information can be associated on a one-to-one basis with the referring host partition code 1904. The order information typically reflects the default billing arrangement for the partition code 1904. If no other billing data is generated via other processes, the billing data in the referring host table 1902 is used. For example, information designating a URL referral fee may be contained in the order information if the reservation request has to be passed to another network. In this example, the other network signaling point may be informed of the costs of processing the reservation request.

FIG. 20 depicts an exemplary embodiment of an exception table. The exception table 2002 is accessed by using an exception partition code 2004. The exception table 2002 is used to route streaming requests around default routing. The exception element identification (ID) 2006 defines the type of element. For example, the element may be a media player type, a packet address, a content type, or another element type. These items may require special handling, such as when an older media player version is not compatible with installed media server software.

The player type 2008 identifies the type of media player being used on the device streaming the media. The player type may be, for example, a Windows Media Server or a proprietary set top box player used by a satellite company or a cable company. The player version number 2010 identifies the media player version. The media type 2012 identifies routing based upon the type of file being requesting. The media type may be, for example, MPEG standard 1, MPEG standard 2 (MPEG-2), MPEG standard 4 (MEG-4), Microsoft ASF, or other encoding standards for media.

The network access type 2014 identifies the type of originating access the viewer is using. The network access type 2014 may be, for example, a cable modem, a cable set top box, an ISP for the internet, or another type. The packet address from range 2016 and packet address to range 2018 are used to route a stream reservation request based upon the packet address. For example, a cable company may deny a pay-per-view request from a set top box owner that is in arrears for the owner's billing account. The set top box packet addresses for all boxes installed in the house may be blocked using this feature. The next function 2020 allows streaming attempts to be routed to another table during stream processing. The next partition 2024 points to an area within the next function table for further stream processing.

FIG. 21 depicts an exemplary embodiment of a PIN table. The PIN table 2102 is used to provide information identifying a viewer's equipment and/or media player software. The PIN table 2102 is accessed via the PIN partition code 2104. A different routing algorithm may be created and stored for the same referring location by creating multiple PIN partition codes for the same location. The element identification (ID) 2106 is an identifier generated by the RTSMS 106 (see FIG. 1). The element identification describes the type of PIN device or software for which this record was generated. The PIN device or software may be, for example, a Real Network Real Player, a set top box software key, a packet address, a web cookie identifier, or another device identification technique. The identifier further may include the element version number 2108 and/or the player identification (ID) 2110.

The packet address from range 2112 and packet address to range 2114 are used to route stream requests based upon packet addresses. For example, a company might insert an advertisement for a video game. It must be compatible with the device or software identified by the element ID 2106. In some cases, a treatment label 2116 may be provided for access to the treatment table 814. Additionally, other attributes may be added to the table where needed. The next function 2118 allows attempts to be routed to another table during streaming processing. The next partition 2120 points to an area within the next function table for further stream processing.

FIG. 22 depicts an exemplary embodiment of a content screening table. The content screening table 2202 performs functions similar to the reservation system described in FIG. 2. However, the content screening table 2202 performs functions that are directly controlled by devices of the network operator in the event that a management system, such as the RTSMS 106 (see FIG. 1), fails. The content screening table 2202 is accessed using a content screen partition code 2204. A different routing algorithm may be created and stored for the same location by creating multiple content screening partition codes for a same location.

An element identification (ID) 2206 is an identifier generated by the RTSMS. The identifier describes the type of content being screened. The content being screened may be, for example, a program, a media rating type, such as the Motion Picture Association's (MPA) NC-17 rating, picture images, and other content types. The media identification (ID) 2208 allows a specific media to be identified within all presentations. Special routing may be applied for such media. For example, if a network owner receives consumer complaints regarding a particular media, the network owner may block access to the media using the media ID 2208, even though the media may be listed in numerous programs and presentations.

The media rating 2210 enables routing content based upon its rating assigned by, for example, independent monitoring groups, such as the MPA. The program ID from range 2212 and the program ID to range 2214 are used to route programs within the identified range of IDs. The next function 2216 enables attempts to be routed to another table during stream processing. The next partition 2218 points to an area within the next function table for further stream processing.

FIG. 23 depicts an exemplary embodiment of a content location table. The content location table 2302 may be cached in memory and used to locate where media is stored throughout a network, such as the streaming system 102. The content location table 2302 stores information identifying individual media and media clips that are to be delivered to a viewer. The media identification (ID) 2304 is used as a key to enter the content location table 2302.

The media category 2306, media class 2308, media rating 2310, and media length 2312 also are included. The media category 2306 may be, for example, a television series, a movie, a music video, or other media categories. The media class 2308 represents a second level of classification. For example, the television series category might have financial programs, world news, soap operas, comedies, or other classifications. The media rating 2310 may be, for example, a rating based on a monitoring group, such as the MPA. The media length 2312 identifies how long the media takes to stream, such as an estimated number of seconds.

The encode rate 2314 identifies the bytes per second of a packet transmission required to view the media. The disk size 2316 is the amount of disk space required to store the media. The content location order identification (ID) 2318 refers to a storage order that can be located in a management system, such as the RTSMS 106. The storage order refers to how much a media owner is being charged to store the media on the signaling system 102. A media file name 2320 may be associated with the storage order and the order ID 2318. The switch identification (ID) 2322 identifies one or more MMSs that contain the media identified by the media file name 2320. The network owner may append other media attributes 1 to N 2324 to use for the content location table 2302.

FIG. 24 depicts an exemplary embodiment of a network status table. The network status table 2402 typically is cached in memory and reflects the current status of all devices required to connect a streaming service. A switch identification (ID) 2404 is used to enter the network status table 2402. Multiple resources are monitored for each switch, causing multiple entries per switch to be entered into the table. Although, in the example of FIG. 24, a single row is depicted.

The secondary key for the network status table 2402 for each row is the resource type 2406. The resource type identifies the resource being monitored and may include, for example, the public packet to bandwidth, signaling bandwidth, disk storage, processor use, and/or other resources. Each resource has an available resource capacity 2408 and a current capacity use 2410 of the resource. The current resource state 2412 also is depicted, such as whether the resource is in a maintenance state, an alarm state, or is available for use. The network owner may append other attributes from 1 to N 2414 to the network status table.

FIG. 25 depicts an exemplary embodiment of a day of year table. The day of year table 2502 is accessed by using a day of year partition code 2504. The from date 2506 and to date 2508 indicates the local date as applicable to the action to be taken during the processing of this table. The next function 2510 enables attempts to be routed to another table during stream processing. The next partition 2512 points to an area within the next function table for further stream processing.

FIG. 26 depicts an exemplary embodiment of a day of week table. The day of week table 2602 is entered using a day of week partition code 2604. The from day 2606 and to day 2608 indicate the local days of the week on which the action to be taken is to occur. The next function 2610 enables attempts to be routed to another table during stream processing. The next partition 2612 points to an area within the next function table for further stream processing.

FIG. 27 depicts an exemplary embodiment of a time of day table. The time of day table 2702 is accessed using a time of day partition code 2704. The from time 2706 and to time 2708 indicate the local times during which an action is to be taken. That is, the entries indicate the time in which an action is to start and a time at which an action is to stop. The next function 2710 enables attempts to be routed to another table during stream processing. The next partition 2712 points to an area within the next function table for further stream processing.

FIG. 28 depicts an exemplary embodiment of a signal route choice table. The signal route choice table 2802 is accessed using a signal route choice partition code 2804. The route number 2806 specifies a route within a routing list. The route choices for a given route label will be processed in the order indicated by the route numbers. Therefore, the signal route choice table 2802 is used to prioritize route choices. For example, a first network, such as the streaming system 102, may be connected to two other networks and delivery terms have been negotiated with each. The network providing the most favorable billing rate to the first network may be selected as the first route choice. The next function 2808 enables attempts to be routed to another table during stream processing. The next partition 2810 points to an area within the next function table for further stream processing.

FIG. 29 depicts an exemplary embodiment of a class of service table. The class of service table 2902 is accessed using an originating signal class of service partition code 2904 and a terminating signal class of service partition code 2906. The next function 2908 enables attempts to be routed to another table during stream processing. The next partition 2910 points to an area within the next function table for further stream processing.

Those skilled in the art will appreciate that variations from the specific embodiments disclosed above are contemplated by the present invention. The invention should not be restricted to the above embodiments, but should be measured by the following claims.

What is claimed is:

1. A method for managing streaming of video content to a client device, the method comprising:
   providing the video content to a content distribution network for storage in a plurality of geographically separated resources of the content distribution network;
   receiving, from the client device via a packet-based telecommunication network, signaling to have the stored video content streamed to the client device; and
   in response to the received signaling, transmitting one or more files to the client device via the packet-based telecommunication network, each of the one or more files being in a format compatible with a media player on the client device, the one or more files comprising (i) an identification of one or more of the resources of the content distribution network available to facilitate streaming of one or more segments of the stored video content to the client device, the identification being dependent at least in part on a relationship between a geographic location of the client device and geographic locations of the resources of the content distribution network, and (ii) an identification of an advertising server, the identification of the advertising server being dependent at least in part on a relationship between the geographic location of the client device and a geographic location of the advertising server, wherein the one or more files, when processed by the client device, cause the client device to communicate with the identified one or more resources of the content distribution network and the advertising server to cause the one or more segments of the stored video to be streamed to the client device by the identified one or more resources of the content distribution network and cause one or more advertisements to be streamed from the advertising server to the client device.

2. The method of claim 1, wherein the one or more files, when processed by the client device, cause the client device to communicate with the identified one or more resources of the content distribution network and the advertising server to cause the one or more advertisements to be streamed to the client device in a predefined sequence with the one or more segments of the stored video.

3. The method of claim 1, wherein the identification of the one or more resources of the content distribution network includes one or more uniform resource locators (URLs) associated with the one or more resources.

4. The method of claim 1, wherein the identification of the advertising server includes a uniform resource locator (URL) associated with the advertising server.

5. The method of claim 1, wherein the identification of the one or more of the resources of the content distribution network available to facilitate streaming of the one or more segments of the stored video content to the client device is further dependent on an attribute of the client device.

6. The method of claim 1, wherein the identification of the advertising server is further dependent on an attribute of the client device.

7. The method of claim 1, further comprising generating a settlement for sharing between at least two parties a percentage of revenue associated with streaming the one or more advertisements to the client device.

8. The method of claim 1, further comprising receiving from the content owner rules specifying at least one of an age restriction, a geographic restriction, and a time restriction for the streaming of the stored video content to the client device, wherein the one or more files, when processed by the client device, cause the client device to communicate with the identified one or more resources of the content distribution network and the advertising server to cause the one or more segments of the stored video to be streamed to the client device by the identified one or more resources of the content distribution network and cause the one or more advertisements to be streamed from the advertising server to the client device in compliance with the one or more rules.

9. The method of claim 1, wherein the video content is one of a movie, a television show, and a live event.

10. The method of claim 1, further comprising:
monitoring a level of service for streaming the stored video to the client device by the identified one or more resources of the content distribution network;
upon detection of a degradation of the level of service, transmitting to the client device, via the packet-based telecommunication network, an identification of another of the one or more of the resources of the content distribution network available to facilitate streaming of one or more other segments of the stored video content to the client device to cause the client device to communicate with the identified other one or more of the resources of the content distribution network to cause the one or more other segments of the stored video to be streamed to the client device by the another one of the resources of the content distribution network.

11. A method for managing streaming of video content to a client device, the method comprising:
providing the video content to a content distribution network for storage in a plurality of geographically separated resources of the content distribution network;
receiving, from the client device via a packet-based telecommunication network, signaling to have the stored video content streamed to the client device;
in response to the received signaling, transmitting one or more files to the client device via the packet-based telecommunication network, each of the one or more files being in a format compatible with a media player on the client device, the one or more files comprising (i) an identification of a first resource of the content distribution network available to facilitate streaming of the stored video content to the client device, the identification being dependent at least in part on a relationship between a geographic location of the client device and geographic locations of the resources of the content distribution network, and (ii) an identification of an advertising server, the identification of the advertising server being dependent at least in part on a relationship between the geographic location of the client device and a geographic location of the advertising server, wherein the one or more files, when processed by the client device, cause the client device to communicate with the first resource of the content distribution network and the advertising server to cause the stored video to be streamed to the client device by the first resource of the content distribution network and cause an advertisement to be streamed from the advertising server to the client device;
monitoring a level of service for the streaming of the stored video to the client device by the first resource of the content distribution network; and
upon detection of a degradation of the level of service, transmitting, to the client device via the packet-based telecommunication network, an identification of a second resource of the content distribution network available to facilitate streaming of a remaining portion of the stored video content to the client device to cause the client device to communicate with the second resource of the content distribution network to cause the stored video to be streamed to the client device by the second resource of the content distribution network instead of the first resource of the content distribution network.

12. The method of claim 11, wherein the one or more files, when processed by the client device, cause the client device to communicate with the second resource of the content distribution network and the advertising server to cause the advertisement to be streamed to the client device in a predefined sequence with the stored video.

13. The method of claim 11, wherein the identification of the first resource of the content distribution network includes a uniform resource locator (URL) associated with the first resource and the identification of the second resource of the content distribution network includes a uniform resource locator (URL) associated with the second resource.

14. The method of claim 11, wherein the identification of the advertising server includes a uniform resource locator (URL) associated with the advertising server.

15. The method of claim 11, wherein the identification of the second resource of the content distribution network is dependent at least in part on the relationship between the geographic location of the client device and the geographic locations of the resources of the content distribution network.

16. The method of claim 11, wherein the identification of the first resource of the content distribution network is further dependent on an attribute of the client device.

17. The method of claim 11, wherein the identification of the advertising server is further dependent on an attribute of the client device.

18. The method of claim 11, further comprising generating a settlement for sharing between at least two parties a percentage of revenue associated with streaming the advertisement to the client device.

19. The method of claim 11, further comprising receiving from the content owner rules specifying at least one of an age restriction, a geographic restriction, and a time restriction for streaming the stored video content to the client device, wherein the one or more files, when processed by the client device, cause the client device to communicate with the first resource of the content distribution network to cause the stored video to be streamed to the client device by the first resource of the content distribution network in compliance with the one or more rules.

20. The method of claim 11, wherein the video content is one of a movie, a television show, and a live event.

* * * * *

(12) INTER PARTES REVIEW CERTIFICATE (3707th)

United States Patent
Jennings et al.

(10) Number: US 10,009,637 K1
(45) Certificate Issued: Sep. 6, 2024

(54) SYSTEM AND METHOD FOR ROUTING MEDIA

(71) Applicants: Charles A. Jennings; Donald H. Bate

(72) Inventors: Charles A. Jennings; Donald H. Bate

(73) Assignee: SITO MOBILE R&D IP, LLC

Trial Number:

IPR2021-00304 filed Dec. 8, 2020

Inter Partes Review Certificate for:

Patent No.: 10,009,637
Issued: Jun. 26, 2018
Appl. No.: 15/693,811
Filed: Sep. 1, 2017

The results of IPR2021-00304 are reflected in this inter partes review certificate under 35 U.S.C. 318(b).

INTER PARTES REVIEW CERTIFICATE
U.S. Patent 10,009,637 K1
Trial No. IPR2021-00304
Certificate Issued Sep. 6, 2024

AS A RESULT OF THE INTER PARTES REVIEW PROCEEDING, IT HAS BEEN DETERMINED THAT:

Claims 1-4 and 7-10 are cancelled.

\* \* \* \* \*